US012775253B2

(12) United States Patent
Nasir et al.

(10) Patent No.: US 12,775,253 B2
(45) Date of Patent: Oct. 27, 2026

(54) MODEL-BASED SUPERVISION AND REFINEMENT OF MODEL PREDICTIVE CONTROL SYSTEMS AND APPLICATIONS

(71) Applicant: NVIDIA Corporation, Santa Clara, CA (US)

(72) Inventors: Mohammed Nasir, Watsonville, CA (US); Yue Sun, Danville, CA (US); Yaashia Gautam, Santa Clara, CA (US); Michael David Hamer, Zurich (CH); Donglei Fan, Beijing (CN)

(73) Assignee: NVIDIA Corporation, Santa Clara, CA (US)

( * ) Notice: Subject to any disclaimer, the term of this patent is extended or adjusted under 35 U.S.C. 154(b) by 19 days.

(21) Appl. No.: 19/025,229

(22) Filed: Jan. 16, 2025

(65) Prior Publication Data

US 2026/0186457 A1 Jul. 2, 2026

(30) Foreign Application Priority Data

Dec. 31, 2024 (CN) ........................ 202411999466.7

(51) Int. Cl.
*G05B 13/04* (2006.01)
*G05B 13/02* (2006.01)
*B60W 50/00* (2006.01)

(52) U.S. Cl.
CPC ......... *G05B 13/048* (2013.01); *G05B 13/027* (2013.01); *B60W 2050/0028* (2013.01); *B60W 50/0097* (2013.01)

(58) Field of Classification Search
CPC ............... G05B 13/048; G05B 13/027; B60W 50/0097; B60W 2050/0028
See application file for complete search history.

(56) References Cited

U.S. PATENT DOCUMENTS

| | | | | |
|---|---|---|---|---|
| 12,028,578 | B2 * | 7/2024 | Tucker | H04N 21/25883 |
| 2013/0069792 | A1 * | 3/2013 | Blevins | G06F 17/16 703/2 |
| 2016/0357169 | A1 * | 12/2016 | Di Cairano | G05B 19/106 |
| 2019/0228327 | A1 * | 7/2019 | Horesh | G06F 30/00 |
| 2022/0240432 | A1 * | 8/2022 | Acedo | G16B 20/00 |

(Continued)

FOREIGN PATENT DOCUMENTS

DE 102025155276 A1 7/2026

*Primary Examiner* — Gertrude Arthur Jeanglaude
(74) *Attorney, Agent, or Firm* — IRON SUMMIT IP LLP

(57) ABSTRACT

In various examples, systems and methods of the present disclosure may use a machine learning model (e.g., a Kolmogorov-Arnold Network) to monitor and improve the performance of a model predictive control (MPC) system associated with a machine. For instance, the machine learning model may be trained and used to predict errors between measured states and predicted states of the machine. Based at least on the predicted errors, the systems may update one or more parameters of a predictive model associated with the MPC system to reduce the differences between the measured states and the predicted states in subsequent iterations. In some examples, if magnitudes of the predicted errors meet or exceed a threshold, the systems of the present disclosure may retrain the machine learning model using new data, thereby allowing the machine learning model to adapt to changing conditions in real-time.

20 Claims, 14 Drawing Sheets

(56) References Cited

U.S. PATENT DOCUMENTS

| | | | | |
|---|---|---|---|---|
| 2023/0316150 | A1* | 10/2023 | Phan | G06N 3/0985 |
| 2023/0345271 | A1* | 10/2023 | Veijalainen | H04W 24/04 |
| 2025/0022175 | A1 | 1/2025 | Wu et al. | |
| 2025/0069385 | A1 | 2/2025 | Wen et al. | |
| 2025/0083704 | A1 | 3/2025 | Ng et al. | |
| 2025/0100581 | A1 | 3/2025 | Henke et al. | |
| 2025/0103885 | A1 | 3/2025 | Muller et al. | |

* cited by examiner

MODEL-BASED SUPERVISION AND REFINEMENT OF MODEL PREDICTIVE CONTROL SYSTEMS AND APPLICATIONS

BACKGROUND

Many of today's complex systems—such as autonomous or semi-autonomous machines, robots, or vehicles—may include and/or use a wide variety of advanced control strategies to perform various operations. For instance, some of these systems may use model predictive control (also abbreviated as "MPC") to predict the future behavior of the systems over a set horizon using mathematical models, as well as to optimize control inputs in real time to achieve desired performance goals while adhering to various constraints, such as system dynamics, safety limits, and/or any other constraints. Because MPC systems may effectively balance multiple inputs and outputs while respecting operations boundaries, MPC may be particularly advantageous in scenarios requiring the handling of multivariable control problems.

In various scenarios, however, the effectiveness of MPC may depend on the accuracy of the mathematical models MPC uses for making predictions. For instance, systems may often exhibit complex behaviors due to the presence of nonlinearities in real-world applications. As an example, nonlinearities that a vehicle might experience may include, but are not limited to, tire slip, changes in road conditions, and/or high-curvature trajectories. Accurately modeling these nonlinearities can be challenging, and the difficulties are further compounded when MPC relies on simplified or linearized versions of the system's dynamics, leading to prediction inaccuracies and, ultimately, suboptimal control performance. Although various approaches have been explored to address the limitations of MPC, these approaches come with trade-offs in scalability, computational demands, and/or effectiveness in handling nonlinear dynamics, thus impacting their practicality in real-time, safety-critical applications.

For instance, Deep Neural Network (DNN) solutions have been proposed to enhance MPC predictive accuracy by learning complex nonlinearities, but the high computational demands of DNNs often make them unsuitable for real-time applications in contexts like autonomous machines and embedded systems. Additionally, while approaches using Gaussian Process Regression (GPR) may provide powerful probabilistic frameworks for modeling uncertainties and nonlinearities, GPR faces scalability issues with large training data and limited interpretability due to complex kernels and hyperparameters, posing challenges in safety-critical applications, such as autonomous driving. Furthermore, Kalman Filters may be effective for parameter estimation in linear systems, but their reliance on predefined models and unmodeled dynamics can lead to estimation errors in nonlinear systems.

SUMMARY

Embodiments of the present disclosure relate to model-based supervision and refinement of model predictive control (MPC) systems and applications. Systems and methods are disclosed that may use a machine learning model—such as a Kolmogorov-Arnold Network (KAN) and/or any other type of machine learning model—to monitor and improve the performance of an MPC system associated with a machine. For instance, the machine learning model may be trained and used to predict errors between measured states and predicted states of the machine. The predicted states of the machine may be determined using a predictive model associated with the MPC system. Based at least on the predicted errors, the systems may update one or more parameters of the predictive model to reduce the differences between the measured states and the predicted states in subsequent iterations. For instance, the systems may update a disturbance vector of the predictive model to improve the accuracy of the predicted states. Additionally, in some examples, if magnitudes of the predicted errors meet or exceed a threshold, the systems of the present disclosure may retrain the machine learning model using new data (e.g., the most recent measured states and predicted states of the machine), thereby allowing the systems to update the machine learning model in real-time to adapt with changing conditions.

In contrast to conventional systems, the systems of the present disclosure, in some embodiments, are able to address the challenges posed by nonlinearities and unmodeled dynamics in MPC by combining data-driven error prediction with KANs, thereby providing more adaptive and precise control strategies for autonomous or semi-autonomous machines and/or other systems. For instance, the systems of the present disclosure are able to use a KAN to predict errors between measured and predicted states of a machine, and update parameters of a predictive model of an MPC system to reduce the magnitudes of the predicted errors. By using a KAN to perform these operations, the systems of the present disclosure may meet automotive safety integrity level (ASIL) D or similar, and may easily satisfy ASIL B or lower classification, due to the inputs and outputs of the KAN—as well as the logic behind why the outputs are generated—are able to be easily understood by human users—which is in contrast to more traditional multi-layer perceptron (MLP)-type or feed-forward type machine learning models that are often classified as "black box" models. Additionally, by using KANs for learning and predicting state errors, the systems of the present disclosure are able to reduce parameter requirements, improve scalability, enhance the ability to model nonlinearities, and achieve more efficient data integration than conventional systems. Furthermore, by periodically retraining the KAN when the magnitude of a predicted error exceeds a certain threshold, the systems of the present disclosure are able to ensure that predictive models of MPC systems remain accurate and responsive to changes in the overall system over time.

BRIEF DESCRIPTION OF THE DRAWINGS

The present systems and methods for model-based supervision and refinement of model predictive control (MPC) systems and applications are described in detail below with reference to the attached drawing figures, wherein.

DETAILED DESCRIPTION

Figure 1:
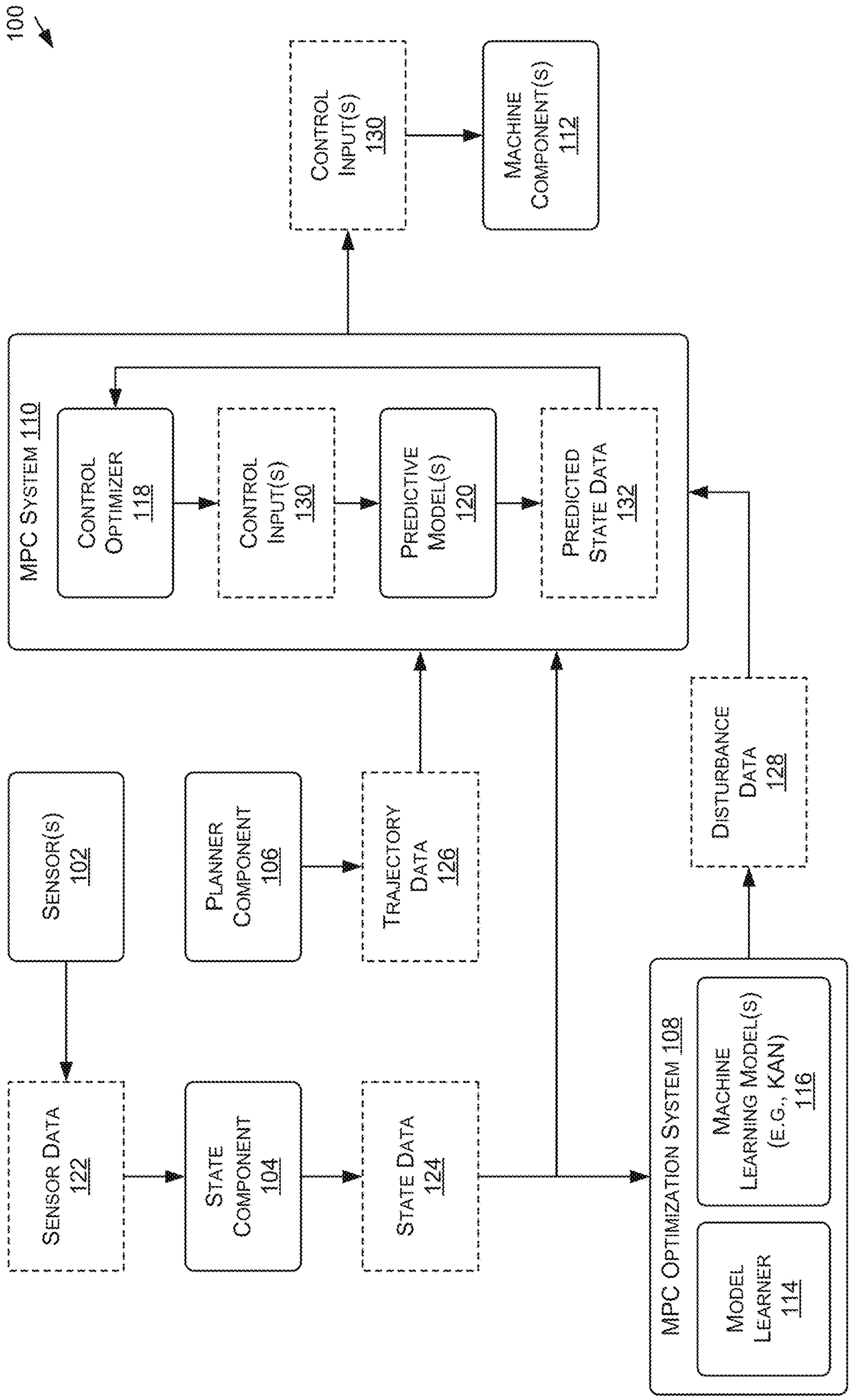
FIG. 1 is a data flow diagram illustrating an example of a process for model-based supervision and refinement of a MPC system, in accordance with some embodiments of the present disclosure.

Systems and methods are disclosed related to model-based supervision and refinement of model predictive control (MPC) systems and applications. Although the present disclosure may be described with respect to an example autonomous or semi-autonomous vehicle or machine 900 (alternatively referred to herein as "vehicle 900," "ego-vehicle 900," "ego-machine 900," or "machine 900," an example of which is described with respect to FIGS. 9A-9D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to autonomous driving, this is not intended to be limiting, and the systems and methods described herein may be used in augmented reality, virtual reality, mixed reality, robotics, security and surveillance, autonomous or semi-autonomous machine applications, and/or any other technology spaces where MPC systems and applications may be used.

By way of example, and not limitation, a system(s) may obtain state data indicative of one or more measured states of a machine. In some examples, the state data may be determined based at least on sensor data generated or obtained using one or more sensors of the machine. For instance, the sensor data may include, but is not limited to, LiDAR data generated or obtained using one or more LiDAR sensors, RADAR data generated or obtained using one or more RADAR sensors, image data generated or obtained using one or more image sensors (e.g., cameras), ultrasonic data generated or obtained using one or more ultrasonic sensors, gyroscope data generated or obtained using one or more gyroscopes, accelerometer data generated or obtained using one or more accelerometers, inertial measurement unit (IMU) data generated or obtained using one or more IMU sensors, data generated or obtained using one or more global navigation satellite system ("GNSS") or Global Positioning System (GPS) sensors, wheel rotation speed from wheel tick encoders, measurements of wheel angles from steering angle sensors, and/or any other sensor data generated or obtained using any other types of sensors. In some instances, the measured state(s) of the machine may include one or more of a lateral position associated with the machine (e.g., relative to a center rail of a lane, relative to one or more surface markings, etc.), an integrated lateral position associated with the machine, a lateral velocity associated with the machine, a lateral acceleration associated with the machine, a heading associated with the machine, a curvature or steering angle associated with the machine, a longitudinal speed associated with the machine, a longitudinal acceleration associated with the machine, and/or a yaw rate associated with the machine.

As described herein, the system(s) may use one or more machine learning models (e.g., one or more Kolmogorov-Arnold Networks (KANs)) to determine or compute predicted errors associated with the measured state(s) of the machine. In some examples, the predicted errors may represent differences or margins of error between the measured state(s) of the machine and one or more predicted states of the machine determined (or to be determined) using one or more predictive models of the MPC system. That is, the predicted errors may represent discrepancies in the predictive model(s) that the MPC system alone may not accurately capture due to its limitations. In some examples, to determine or compute the predicted errors, the system(s) may use the machine learning model(s) to process the state data. For instance, based on the measured state(s) of the machine, the machine learning model(s) may predict the amount of error between predicted states of the machine (to be determined using the predictive model(s) of the MPC) and future measured state(s) of the machine for the next timestep of the MPC system. In some instances, the predicted errors may include, but are not limited to, a predicted lateral position error, a predicted integrated lateral position error, a predicted lateral velocity error, a predicted heading error, a predicted curvature error, or any other predicted errors associated with the measured state(s) of the machine and/or the predicted states of the machine.

In various examples described herein, the machine learning model(s) may include a Kolmogorov-Arnold Network (KAN) (e.g., one or more KANs) or another type of neural network. In some instances, the KAN may use one or more basis splines (also referred to as "B-splines") and measurement data (e.g., state data, predicted state data, etc.) to capture the nonlinearities between inputs and outputs more effectively than traditional methods without requiring an excessive number of parameters. By integrating measurement data with B-splines, the KAN may better map real-world, nonlinear input-output relationships that traditional linear models (e.g., the MPC predictive model) or polynomial regression methods may struggle to capture. For instance, in control systems or mechanical simulations where input-output relationships are influenced by numerous factors and nonlinear dynamics, the KAN may capture these subtleties without excessive computational burden. Additionally, by learning the nonlinear relationships directly from the data, the KAN may offer a more accurate representation of the underlying system dynamics. This direct learning approach means the network may not solely rely on predefined equations or assumptions about data behavior. Instead, the KAN may identify and fit the most appropriate functions to the data, accounting for underlying complexities and nuances. This leads to better generalization in real-world scenarios where non-linear relationships dominate, such as in autonomous vehicle path planning, energy consumption prediction, or environmental modeling.

In some examples, by using a KAN to predict the error between measured and predicted states of the machine, the system(s) may improve a safety level associated with the MPC system. For instance, because the KAN is more transparent than other machine learning techniques, the system(s) may be capable of meeting or exceeding Automotive Safety Integrity Level (ASIL) D and/or other ASIL or safety levels of risk classification. In other words, because the inputs and outputs of the KAN—as well as the logic behind why the outputs are generated—are able to be easily understood by human users, the system(s) may meet ASIL D and/or other levels of risk classification (e.g., ASIL C, etc.). That is, with respect to KANs, because KANs or similar networks have learnable activation functions on the edges between nodes, and sum operations on the nodes (e.g., where every edge has a different activation function), these learnable functions (B-splines) help to directly represent non-linear input transformations in a way that is identifiable and understandable. In contrast, traditional neural networks that rely on MLP or similar structures often have fixed activation functions on nodes and learnable weights on edges, such that all neurons have fixed activation functions, making them more like a black box that may be more difficult to fully understand.

In some examples, the system(s) may update one or more parameters associated with the predictive model(s) of the MPC system. For instance, based at least on the predicted errors determined using the machine learning model(s), the system(s) may update the parameter(s) of the predictive model(s) to reduce the magnitudes of the predicted errors between future predicted states of the machine and future measured states of the machine. In some examples, updating the parameter(s) of the predictive model(s) may include updating a disturbance vector of the predictive model(s). For instance, the system(s) may compute one or more disturbance values based on the predicted error(s), and update the disturbance vector to include the disturbance value(s). In some instances, the machine learning model(s) may compute the disturbance value(s) as part of—or in addition to—predicting the error between the measured states and the predicted states of the machine.

In some instances, subsequent to the system(s) updating the parameter(s) of the predictive model(s), the MPC system may use the predictive model(s) as part of its framework to determine control inputs for controlling various systems or components of the machine. For instance, the MPC system may receive, as inputs, the current measured state of the machine, a planned path or trajectory of the machine, a current location of the machine, and/or other inputs. The MPC system may use these inputs to determine control inputs or commands to apply to the systems or components of the machine such that the next state of machine corresponds to the planned path or trajectory, while operating within a particular set of constraints (e.g., max speed, max angular velocity, etc.). To do this, the MPC system may use the predictive model(s) to simulate the response of the system (e.g., predict the state of the machine) based on applying various control inputs. The MPC system may use these simulated/predicted states of the machine to refine or update the control inputs until the predicted state matches (or most closely matches) the planned trajectory or next state of the machine.

Once the control inputs are finalized, the MPC system may then apply the control inputs to the components or systems of the machine to cause the machine to follow the planned path or trajectory, or perform any other operations. In some examples, the control inputs may include, but are not limited to, inputs to adjust steering angles of the machine, manage a speed of the machine (e.g., brake inputs, accelerator inputs, etc.), alter suspension settings, modify transmission gear ratios, control differential lock settings, manage traction control systems, regulate stability control parameters, or to cause the machine to perform any other operations.

As described herein, in some examples, the system(s) may include an online retraining mechanism for the machine learning model(s). This mechanism may be activated when the predicted error for a particular state exceeds some threshold (e.g., a predefined threshold, a dynamically determined threshold, etc.). When this occurs, the machine learning model(s) may undergo a retraining cycle that updates its parameters based on new data, allowing the machine learning model(s) to adapt to changing conditions in real-time. In some instances, the retraining process may build upon the previously learned parameters of the machine learning model(s), ensuring that the model(s) continuously improves its accuracy without starting from scratch each time. For example, if the system(s) determine that the predicted error is starting to diverge even after machine learning model(s) output is correcting it, then the system(s) may start to retrain the machine learning model(s) online or fine tune the model(s) online with the new data to hopefully fit to that new information. So, for example, if the machine is operating on a dry road and then suddenly goes to a wet road such that the machine dynamics are slightly different, the system(s) may start seeing that the predicted errors are increased and will reoptimize the machine learning model(s) based on the new data. As another example, if a physical change associated with the machine has occurred (e.g., new tires, new brake pads, altered mass distribution (e.g., different number or weight of passengers and/or cargo, towing, etc.), the system(s) may start seeing that the predicted errors are increased and will reoptimize the machine learning model(s) based on the new data.

In some examples, the system(s) may determine that one or more magnitudes of the predicted differences meet or exceed one or more thresholds. Based at least on the magnitude(s) meeting or exceeding the threshold(s), the system(s) may update one or more parameters of the machine learning model(s) to reduce the magnitude(s) of the predicted differences below the threshold(s). In some instances, to retrain the machine learning model(s), the system(s) may use one or more of the previously measured states of the machine as training input data. Additionally, the system(s) may use, as ground truth data, one or more calculated differences (e.g., errors) between the previously measured state(s) and one or more previously predicted states of the machine that correspond to the previously measured state(s).

In some examples, the system(s) may maintain (e.g., in one or more databases) a history of the previously measured states of the machine, a history of the previously predicted states of the machine and/or state transitions between the measured states, and/or a history of previously executed control operations. During the retraining phase, the system(s) may obtain these data sources and use them to optimize the machine learning model(s). For instance, the system(s) may preprocess the previously measured states and the previously predicted states to compute the differences and/or measured error between them. The system(s) may then use the measured error/differences to train the machine learning model(s) to determine the predicted error between the states. For instance, the system(s) may apply the measured states to the machine learning model(s), and then update parameters of the model(s) to minimize losses between the predicted errors determined by the model(s) and the measured errors of the ground truth data. In other words, the system(s) may compare the predicted errors with the measured errors during the training phase, and then optimize the model(s) based on the comparing to reduce the differences.

In some embodiments, the systems and methods described herein may be performed within a simulation environment (e.g., NVIDIA's DriveSIM) using simulated data (e.g., simulated sensor data, machine states, etc.). For example, simulated input data (e.g., state data) may be used to determine predicted errors associated with measured states of the virtual machine, and this information may be used to perform operations associated with the virtual machine within the simulation environment. These simulated operations may be used to test performance of the underlying algorithms, systems, and/or processes prior to deploying them in the real-world. In some instances, the simulation may be used to generate synthetic training data from within the simulation. The synthetic training data (in addition to or alternatively from real-world data) may then be processed to train a model(s) to determine predicted errors associated with measured states of a machine, such as predicted errors between measured and predicted states of a machine operating in a warehouse.

In any example, such as where a simulation environment is used for testing, validation, training, etc., the simulation environment and/or associated training data may be rendered or otherwise generated using one or more light transport algorithms—such as ray-tracing and/or path-tracing algorithms. In some embodiments, the simulation environment and/or one or more objects, features, or components thereof may be generated or managed within a three-dimensional (3D) content collaboration platform (e.g., NVIDIA's OMNIVERSE) for industrial digitalization, generative physical AI, and/or other use cases, applications, or services. For example, the content collaboration platform or system may include a system for using or developing universal scene descriptor (USD) (e.g., OpenUSD) data for managing objects, features, scenes, etc. within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems—such as systems for testing, validating, training (e.g., machine learning models, neural networks, KANs, etc.), and/or other tasks related to automotive, robotic, machine, or other applications. In some examples, the simulation environment may include a digital twin of a real environment, such as a digital twin of a specific stretch of roadway, a warehouse, a data center, an airport, a geographic area, a marine area, or any other real environment where autonomous or semi-autonomous machines may operate.

Although examples are described herein with respect to using neural networks, and specifically KANs in machine learning models, this is not intended to be limiting. For example, and without limitation, any of the various machine learning models and/or neural networks described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoder neural networks, artificial neural networks (ANNs), convolutional neural networks (CNNs), recurrent neural networks (RNNs), perceptrons, Long/Short Term Memory (LSTM) networks, multi-layer perceptron (MLP) networks, deep stacking networks (DSNs), generative pre-training (GPT) models or networks, feed forward networks, radial basis function ANNs, self-organizing maps (SOMs), Kohonen maps, Hopfield networks, Boltzmann machine, deep belief neural networks, deconvolutional neural networks, generative adversarial networks (GANs), liquid state machines, modular neural networks, liquid state machines, sequence-to-sequence models, networks using transformer architectures, diffusion models (e.g., diffusion probabilistic models, score-based generative models, etc.), neural rendering field (NeRF) models, models with encoder-only architectures, models with decoder-only architectures, models with encoder-decoder architectures, generative machine learning models, language models, large language models (LLMs), vision language models (VLMs), multi-modal language models (MMLMs), etc.), and/or other types of machine learning models.

In some examples, the machine learning model(s) (e.g., KANs, deep neural networks, language models, LLMs, VLMs, multi-modal language models, perception models, tracking models, fusion models, transformer models, diffusion models, encoder-only models, decoder-only models, encoder-decoder models, neural rendering field (NERF) models, etc.) described herein may be packaged as a microservice—such as an inference microservice (e.g., NVIDIA NIMs)—which may include a container (e.g., an operating system (OS)-level virtualization package) that may include an application programming interface (API) layer, a server layer, a runtime layer, and/or a model "engine." For example, the inference microservice may include the container itself and the model(s) (e.g., weights and biases).

In some instances, such as where the machine learning model(s) is small enough (e.g., has a small enough number of parameters), the model(s) may be included within the container itself. In other examples—such as where the model(s) is large—the model(s) may be hosted/stored in the cloud (e.g., in a data center) and/or may be hosted on-premises and/or at the edge (e.g., on a local server or computing device, but outside of the container). In such embodiments, the model(s) may be accessible via one or more APIs-such as REST APIs. As such, and in some embodiments, the machine learning model(s) described herein may be deployed as an inference microservice to accelerate deployment of a model(s) on any cloud, data center, or edge computing system, while ensuring the data is secure. For example, the inference microservice may include one or more APIs, a pre-configured container for simplified deployment, an optimized inference engine (e.g., built using a standardized AI model deployment an execution software, such as NVIDIA's Triton Inference Server, and/or one or more APIs for high performance deep learning inference, which may include an inference runtime and model optimizations that deliver low latency and high throughput for production applications—such as NVIDIA's TensorRT), and/or enterprise management data for telemetry (e.g., including identity, metrics, health checks, and/or monitoring).

The machine learning model(s) described herein may be included as part of the microservice along with an accelerated infrastructure with the ability to deploy with a single command and/or orchestrate and auto-scale with a container orchestration system on accelerated infrastructure (e.g., on a single device up to data center scale). As such, the inference microservice may include the machine learning model(s) (e.g., that has been optimized for high performance inference), an inference runtime software to execute the machine learning model(s) and provide outputs/responses to inputs (e.g., user queries, prompts, etc.), and enterprise management software to provide health checks, identity, and/or other monitoring. In some embodiments, the inference microservice may include software to perform in-place replacement and/or updating to the machine learning model(s). When replacing or updating, the software that performs the replacement/updating may maintain user configurations of the inference runtime software and enterprise management software.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing language models, such as large language models (LLMs), vision language models (VLMs), and/or multi-modal language models, systems implementing one or more vision language models (VLMs), systems implementing one or more multi-modal language models, systems using or deploying one or more inference microservices, systems that incorporate deploy one or more machine learning models in a service or microservice along with an OS-level virtualization package (e.g., a container), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 is a data flow diagram illustrating an example of a process 100 for model-based supervision and refinement of a MPC system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 900 of FIGS. 9A-9D, example computing device 1000 of FIG. 10, and/or example data center 1100 of FIG. 11.

The process 100 shown in the example of FIG. 1 may be implemented using, amongst additional or alternative components, one or more sensors 102, a state component 104, a planner component 106, an MPC optimization system 108 including a model learner 114 and one or more machine learning models 116, an MPC system 110 including a control optimizer 118 and one or more predictive models 120, and one or more machine components 112. In some examples, one or more of these components may be embodied in software, hardware, or a combination thereof.

As a brief overview, the process 100 may include the state component 104 using sensor data 122 of the sensor(s) 102 to generate state data 124 representing one or more states (e.g., measured states) of a machine. The state data 124 may be applied as inputs to the MPC optimization system 108 and the MPC system 110. The MPC optimization system 108 may use the machine learning model(s) 116 to process the state data 124 to predict errors associated with the measured states of the machine, and then generate disturbance data 128 for updating a disturbance vector of the predictive model(s) 120. The process 100 may also include the MPC system 110 obtaining trajectory data 126 as an input from the planner component 106. The MPC system 110 may use the control optimizer to propose one or more control inputs 130 based on the state data 124 and the trajectory data 126. Based on the control input(s) 130, the predictive model(s) 120 of the MPC system 110 may generate predicted state data 132 representing a predicted state (e.g., next state) of the machine responsive to the control input(s) 130 being applied to the machine component(s) 112. The control optimizer 118 may use the predicted state data 132 to evaluate and/or adjust the control input(s) 130. After optimization, the MPC system 110 may cause the control input(s) 130 to be applied or sent to the machine component(s) 112.

In some examples, the sensor(s) 102 may include any one or more of the sensors of the autonomous vehicle 900. For instance, the sensor(s) 102 may include one or more of a global navigation satellite systems ("GNSS") sensor(s) (e.g., Global Positioning System (GPS) sensor(s)), a RADAR sensor(s), an ultrasonic sensor(s), a LIDAR sensor(s), an inertial measurement unit (IMU) sensor(s) (e.g., accelerometer(s), gyroscope(s), magnetic compass(es), magnetometer(s), etc.), a microphone(s), an image sensor(s) (e.g., camera), a speed sensor(s) (e.g., for measuring the speed of the vehicle 900), a vibration sensor(s), a steering sensor(s), a brake sensor(s) (e.g., as part of the brake sensor system 946), and/or other sensor types. As such, the sensor data 122 may include, but is not limited to, one or more of GNSS data, GPS data, RADAR data, ultrasonic data, LIDAR data, IMU data (e.g., accelerometer data, gyroscope data, etc.), audio data, image data, speed data, vibration data, steering sensor data, and/or brake sensor data. In some examples, the sensor data 122 may be indicative or representative of one or more measured states of the machine.

Additionally, or alternatively, in some instances the state component 104 may use the sensor data 122 to generate or otherwise determine the state data 124, which may represent the measured state(s) of the machine. In some examples, the states component 104 may include one or more models (e.g., classical or mathematical models) to generate the state data 124 and/or determined the measured state(s) of the machine using the sensor data 122. In some instances, the measured state(s) of the machine may include one or more of a lateral position associated with the machine (e.g., relative to a center rail of a lane, relative to one or more surface markings, etc.), an integrated lateral position associated with the machine (e.g., lateral position over time), a lateral velocity associated with the machine, a heading associated with the machine, and/or a curvature associated with the machine (e.g., inverse of the radius of curvature). As shown in the example of FIG. 1, the state data 124 may be applied as input(s) to the MPC optimization system 108 and/or the MPC system 110.

The planner component 106 may generate trajectory data 126 representing a planned path or trajectory of the machine. In some instances, the planner component 106 may determine the planned path/trajectory based on one or more of a predetermined route of the machine, locations of objects in an environment of the machine, paths or trajectories of those objects, traffic rules associated with a driving surface (e.g., road) the machine is traversing, a topology of the driving surface, environmental conditions, or any other inputs to the planner component 106. As shown in the example of FIG. 1, the trajectory data 126 may be applied as an input to the MPC system 110.

The MPC optimization system 108 may be configured to monitor and refine (e.g., make adjustments or updates) the MPC system 110. The MPC optimization system 108 may include the model learner 114 and the machine learning model(s) 116. The model learner 114 may be configured to determine when the machine learning model(s) 116 is to be retrained or reoptimized based on the predicted errors determined using the machine learning model(s) 116 meeting or exceeding a threshold. The MPC optimization system 108 may use the machine learning model(s) 116 to determine or compute predicted errors associated with the measured state(s) of the machine represented by the state data 124. In some examples, the predicted errors may represent differences or margins of error between the measured state(s) of the machine and one or more predicted states of the machine determined (or to be determined) using the predictive model(s) 120 of the MPC system 110. That is, the predicted errors may represent discrepancies in the predictive model(s) 120 that the MPC system 110 alone may not accurately capture due to its limitations. In some examples, to determine or compute the predicted errors, the MPC optimization system 108 may use the machine learning model(s) 116 to process the state data 124. For instance, based on the measured state(s) of the machine, the machine learning model(s) 116 may predict the amount of error between predicted states of the machine (to be determined using the predictive model(s) 120 of the MPC) and future measured state(s) of the machine for the next timestep of the MPC system 110. In some instances, the predicted errors may include, but are not limited to, a predicted lateral position error, a predicted integrated lateral position error, a predicted lateral velocity error, a predicted heading error, a predicted curvature error, or any other predicted errors associated with the measured state(s) of the machine and/or the predicted states of the machine.

In various examples described herein, the machine learning model(s) 116 may include a Kolmogorov-Arnold Network (KAN) (e.g., one or more KANs) or another type of neural network. In some instances, the KAN may use one or more basis splines (also referred to as "B-splines") and measurement data (e.g., state data, predicted state data, etc.) to capture the nonlinearities between inputs and outputs more effectively than traditional methods without requiring an excessive number of parameters. By integrating measurement data with B-splines, the KAN may better map real-world, nonlinear input-output relationships that traditional linear models (e.g., the MPC predictive model) or polynomial regression methods may struggle to capture. For instance, in control systems or mechanical simulations where input-output relationships are influenced by numerous factors and nonlinear dynamics, the KAN may capture these subtleties without excessive computational burden. Additionally, by learning the nonlinear relationships directly from the data, the KAN may offer a more accurate representation of the underlying system dynamics. This direct learning approach means the network may not solely rely on predefined equations or assumptions about data behavior. Instead, the KAN may identify and fit the most appropriate functions to the data, accounting for underlying complexities and nuances. This leads to better generalization in real-world scenarios where non-linear relationships dominate, such as in autonomous vehicle path planning, energy consumption prediction, or environmental modeling.

In some examples, by using a KAN to predict the error between measured and predicted states of the machine, the system(s) may improve a safety level associated with the MPC system 110. For instance, because the KAN is more transparent than other machine learning techniques, the system(s) may be capable of meeting or exceeding Automotive Safety Integrity Level (ASIL) D and/or other ASIL levels of risk classification. In other words, because the inputs and outputs of the KAN—as well as the logic behind why the outputs are generated—are able to be easily understood by human users, the system(s) may meet ASIL D and/or other levels of risk classification (e.g., ASIL C, etc.).

In some examples, the MPC optimization system 108 may update one or more parameters associated with the predictive model(s) 120 of the MPC system 110. For instance, based at least on the predicted errors determined using the machine learning model(s) 116 to process the state data 124, the MPC optimization system 108 may update the parameter(s) of the predictive model(s) 120 to reduce the magnitudes of the predicted errors between future predicted states of the machine and future measured states of the machine. In some examples, updating the parameter(s) of the predictive model(s) 120 may include updating a disturbance vector of the predictive model(s) 120. For instance, the MPC optimization system 108 may generate disturbance data 128 representative of one or more disturbance values based on the predicted error(s), and update the disturbance vector to include the disturbance value(s). In some instances, the machine learning model(s) 116 may compute the disturbance value(s) as part of—or in addition to—predicting the error between the measured states and the predicted states of the machine.

Figure 2:
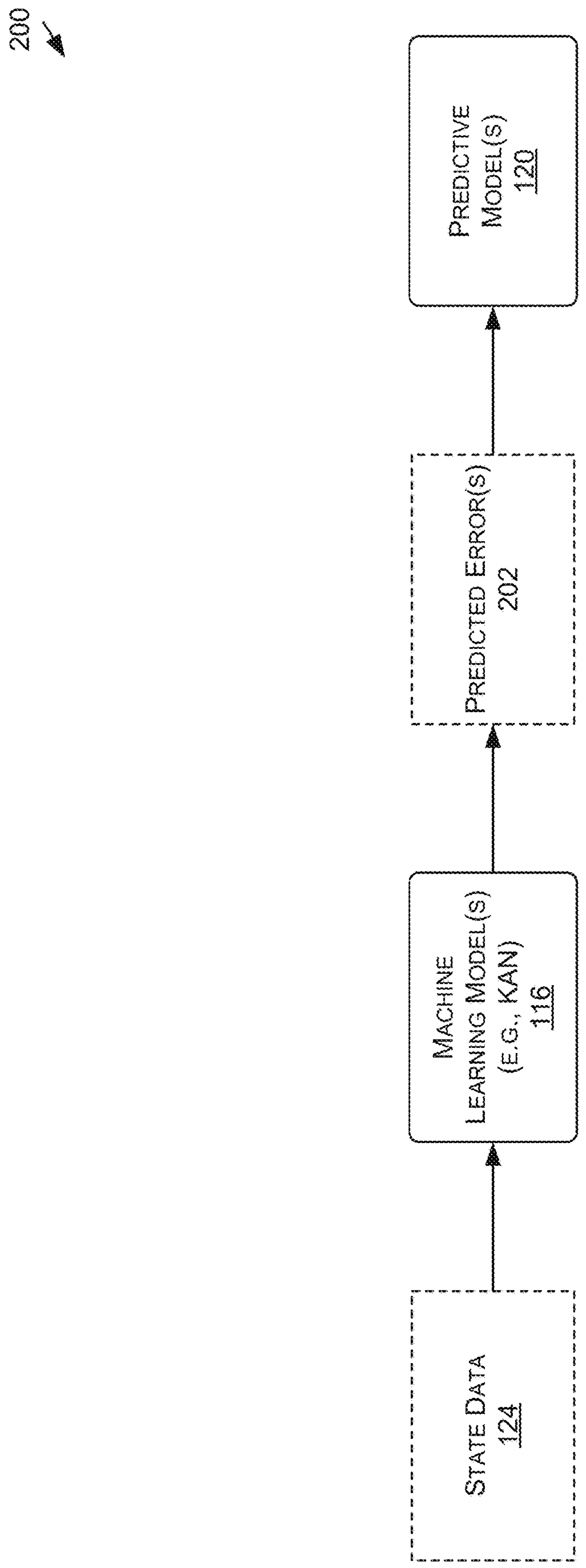
FIG. 2 is a data flow diagram illustrating an example of a prediction phase associated with one or more machine learning models of the MPC optimization system, in accordance with some embodiments of the present disclosure.

For instance, FIG. 2 is a data flow diagram illustrating an example of a prediction phase 200 associated with the machine learning models 116 of the MPC optimization system 108, in accordance with some embodiments of the present disclosure. As shown in the example of FIG. 2, the machine learning model(s) 116 (which may include a KAN or other neural network) may receive the state data 124 and determine one or more predicted errors 202 associated with the state data 124. The predicted error(s) 202 may then be sent to the predictive model(s) 120 or otherwise used to update parameters of the predictive model(s) 120. For instance, the predicted error(s) 202 may represent the disturbance data 128 and be used to update a disturbance vector of the predictive model(s) 120. In the context of the predictive model(s) 120, the disturbance vector (or disturbance vectors) may represent external inputs, external forces, or perturbations that disrupt the normal functioning of the system, such as environmental factors, noise, difference in physical system parameters (e.g., tire cornering stiffness), or any unmodeled dynamics that may cause deviations from desired behavior. The disturbance vector(s) may include the disturbance data 128 (e.g., disturbance values), which may quantify the magnitude and direction of these disturbances across multiple dimensions and/or variables.

Referring back to the example of FIG. 1, the process 100 may include the MPC system 110 using the predictive model(s) 120 as part of its framework to determine the control input(s) 130 for controlling the machine component(s) 112. For instance, the MPC system 110 may receive, as inputs, the state data 124 representing the current measured state of the machine and the trajectory data 126 representing a planned path or trajectory for the machine to follow. The MPC system 110 may use these inputs to determine the control input(s) 130 to apply to the machine component(s) 112 such that the next state of the machine corresponds to the planned path or trajectory, while operating within a particular set of constraints (e.g., max speed, max angular velocity, etc.). To do this, the MPC system 110 may use the control optimizer 118 to propose the control input(s) 130 and use the predictive model(s) 120 to simulate the response of the system (e.g., predict the state of the machine) based on applying that control input(s) 130. The control optimizer 118 may use the predicted state data 132 representing the predicted or simulated machine state to refine or update the control input(s) 130 until the predicted state matches the planned trajectory or next state of the machine, or is within some threshold of the planned trajectory or next state of the machine. In other words, the control optimizer 118 may use the predicted state data 132 representing the predicted or simulated machine state to refine or update the control input(s) 130 in order to optimize some objective function, which may comprise zeroing one or more of the vehicle states, zeroing one or more of the tracking errors, and/or zeroing one or more of the planned trajectory states. For instance, generally the system(s) may refrain from perfect trajectory tracking since this may result in undesirable machine behavior (e.g., jerky or twitchy steering). By improving the prediction, the generated control command(s) may be closer to what actually needs to be done, meaning less need to overreact in the future (e.g., if the machine is tracking worse than expected, the system(s) may need a larger steering input in the future to correct).

Once the control input(s) 130 are finalized, the MPC system 110 may then apply the control input(s) 130 to the machine component(s) 112 to cause the machine to follow the planned path or trajectory, or perform any other operations. In some examples, the control input(s) 130 may include, but are not limited to, inputs to adjust steering angles of the machine, manage a speed of the machine (e.g., brake inputs, accelerator inputs, etc.), alter suspension settings, modify transmission gear ratios, control differential lock settings, manage traction control systems, regulate stability control parameters, or to cause the machine to perform any other operations. Additionally, the machine component(s) 112 may include any systems or components of the machine (e.g., the vehicle 900), such as steering systems or components, acceleration systems or components, braking systems or components, suspension systems or components, traction control systems or components, transmission systems or components, etc.

As described herein, in some examples, the MPC optimization system 108 may include an online retraining mechanism (e.g., the model learner 114) for the machine learning model(s) 116. The model learner 114 may be activated when the predicted error for a particular state exceeds some threshold (e.g., a predefined threshold, a dynamically determined threshold, etc.). When this occurs, the model learner 114 may cause the machine learning model(s) 116 to undergo a retraining cycle that updates the parameters of the model(s) 116 based on new data, allowing the machine learning model(s) 116 to adapt to changing conditions in real-time. In some instances, the retraining process may build upon the previously learned parameters of the machine learning model(s) 116, ensuring that the model(s) 116 continuously improves its accuracy without starting from scratch each time. For example, if the model learner 114 determines that the predicted error is starting to diverge even after the disturbance data 128 is correcting it, then the model learner 114 may start to retrain the machine learning model(s) 116 online or fine tune the model(s) online with the new data to fit to that new information. So, for example, if the machine is operating on a dry road and then suddenly goes to a wet road such that the machine dynamics are slightly different, the model learner 114 may start seeing that the predicted errors are increased and will reoptimize the machine learning model(s) 116 based on the new data. In some instances, this new data may include one or more of the previously measured states of the machine (e.g., state data 124) as training input data. Additionally, the model learner 114 may use, as ground truth data, one or more calculated differences (e.g., errors) between the previously measured state(s) and one or more previously predicted states of the machine that correspond to the previously measured state(s).

Figure 3:
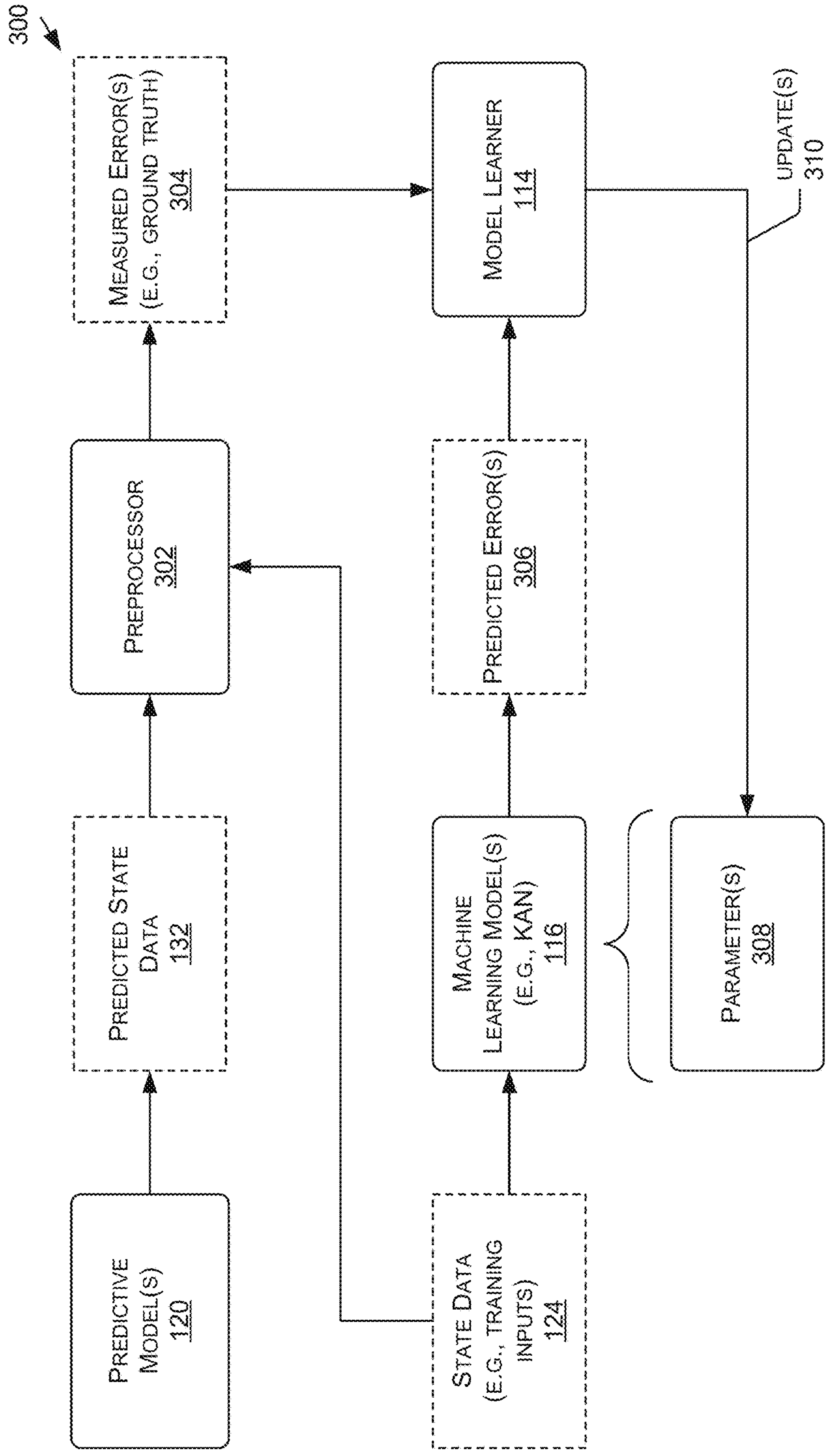
FIG. 3 is a data flow diagram illustrating an example of a training or retraining phase associated with the machine learning model(s) of the MPC optimization system, in accordance with some embodiments of the present disclosure.

For instance, FIG. 3 is a data flow diagram illustrating an example of a training or retraining phase 300 (e.g., online retraining) associated with the machine learning model(s) 116 of the MPC optimization system 108, in accordance with some embodiments of the present disclosure. In some examples, the training or retraining phase 300 may be initiated and carried out by the model learner 114. As shown in the example of FIG. 3, a preprocessor 302 may obtain the predicted state data 132 determined by the predictive model(s) 120, as well as the state data 124, and use the predicted state data 132 and the state data 124 to generate measured error(s) 304. The measured error(s) 304 may represent the calculated errors or differences between the predicted states of the machine and the measured states of the machine. The measured error(s) 304 may also serve as ground truth for the training or retraining of the machine learning model(s) 116.

The machine learning model(s) 512 may be trained or retrained using, as training inputs, the state data 124 as well as corresponding ground truth data, which may include the measured error(s) 304. For instance, based on the input states data 124, the machine learning model(s) 116 may determine one or more predicted errors 306 between the state data 124 and the predicted state data 132. The model learner 114 may compare the predicted error(s) 306 with the measured error(s) 304 and, based on differences between the two, apply one or more updates 310 to one or more parameters 308 of the machine learning model(s) 116.

In various examples, the model learner 114, or a training engine of the model learner 114, may use one or more loss functions that measure loss (e.g., error) in the predicted error(s) 306 generated by the machine learning model(s) 116 as compared to the measured error(s) 304. The model learner 114 may update/optimize the parameter(s) 308 associated with the machine learning model(s) 116 to reduce the losses/differences between predicted error(s) 306 and the measured error(s) 304. Any type of loss function may be used, such as cross entropy loss, mean squared error, mean absolute error, mean bias error, and/or other loss function types. In some examples, different outputs may have different loss functions. In such examples, the loss functions may be combined to form a total loss, and the total loss may be used to train (e.g., update the parameters of) the machine learning model(s) 116. In any example, backward pass computations may be performed to recursively compute gradients of the loss function(s) with respect to training parameters. In some examples, weight and biases of the machine learning model(s) 116 may be used to compute these gradients.

Figure 4:
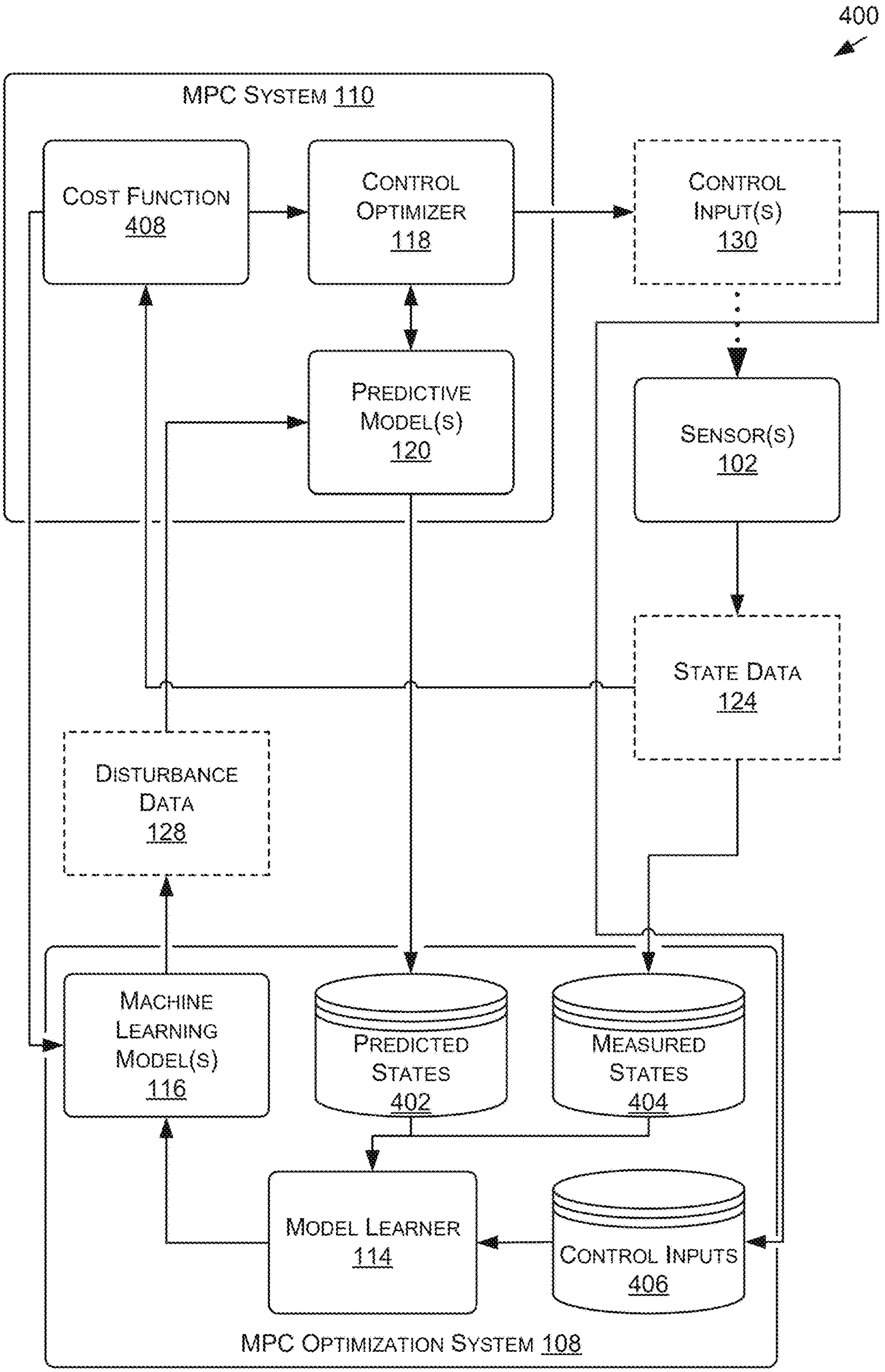
FIG. 4 is a data flow diagram illustrating example data communications between an MPC system and an MPC optimization system, in accordance with some embodiments of the present disclosure.

Referring now to FIG. 4, FIG. 4 is a data flow diagram illustrating example data communications 400 between the MPC system 110 and the MPC optimization system 108, in accordance with some embodiments of the present disclosure. In some examples, the MPC optimization system 108 may maintain (e.g., in one or more databases) a history of the previously measured states 404 of the machine, a history of the previously predicted states 402 of the machine and/or state transitions between the measured states, and/or a history of previously executed control inputs 406. During the retraining phase, the model learner 114 may obtain these data sources and use them to optimize the machine learning model(s) 116. For instance, the model learner 114 may use the predicted states 402, the measured states 404, and the control inputs 406 to train the machine learning model(s) 116. The machine learning model(s) 116 may use the measured states 404 to determine the disturbance data 128, which may then be used to update a disturbance vector associated with the predictive model(s) 120.

In some examples, the MPC system 110 may include a cost function 408. The cost function 408 may include or represent a mathematical representation of the objective the MPC system 110 aims to achieve. The cost function 408 may evaluate the "cost" or "penalty" associated with a predicted control action over a defined future horizon. In some examples, the cost function 408 may also quantify the differences between the predicted outputs of the MPC system 110 and the desired reference trajectory, with the goal of minimizing this difference (also referred to as "tracking error"). The cost function 408 may also penalize the magnitude or rate of change of the control input(s) 130 to prevent overly aggressive control actions that could be impractical or unsafe. The cost function may be accessible or provided to the control optimizer 118 and/or the machine learning model(s) 116, as shown.

The control optimizer 118 may optimize the control input(s) 130 for the next state of the MPC system 110 using the predictive model(s) 120 to simulate the machine behavior responsive to the control input(s) 130. The selected or optimized control input(s) 130 may be stored in a database of the MPC optimization system (e.g., the control inputs database 406). The predictive model(s) 120 may use the control input(s) 130 to determine the predicted states 402 of the machine, which may be stored in the database of the MPC optimization system 108.

Based on the machine performing operations responsive to the control input(s) 130, the sensor(s) 102 of the machine may generate sensor data indicative of measured states of the machine. State data 124 representing these measured states may also be stored as the measured states 404 in a database of the MPC optimization system 108. The state data 124 may also be fed back into the cost function 408 of the MPC system 110, where the state data 124 may be used to determine the control input(s) 130 for the next state.

Figure 5:
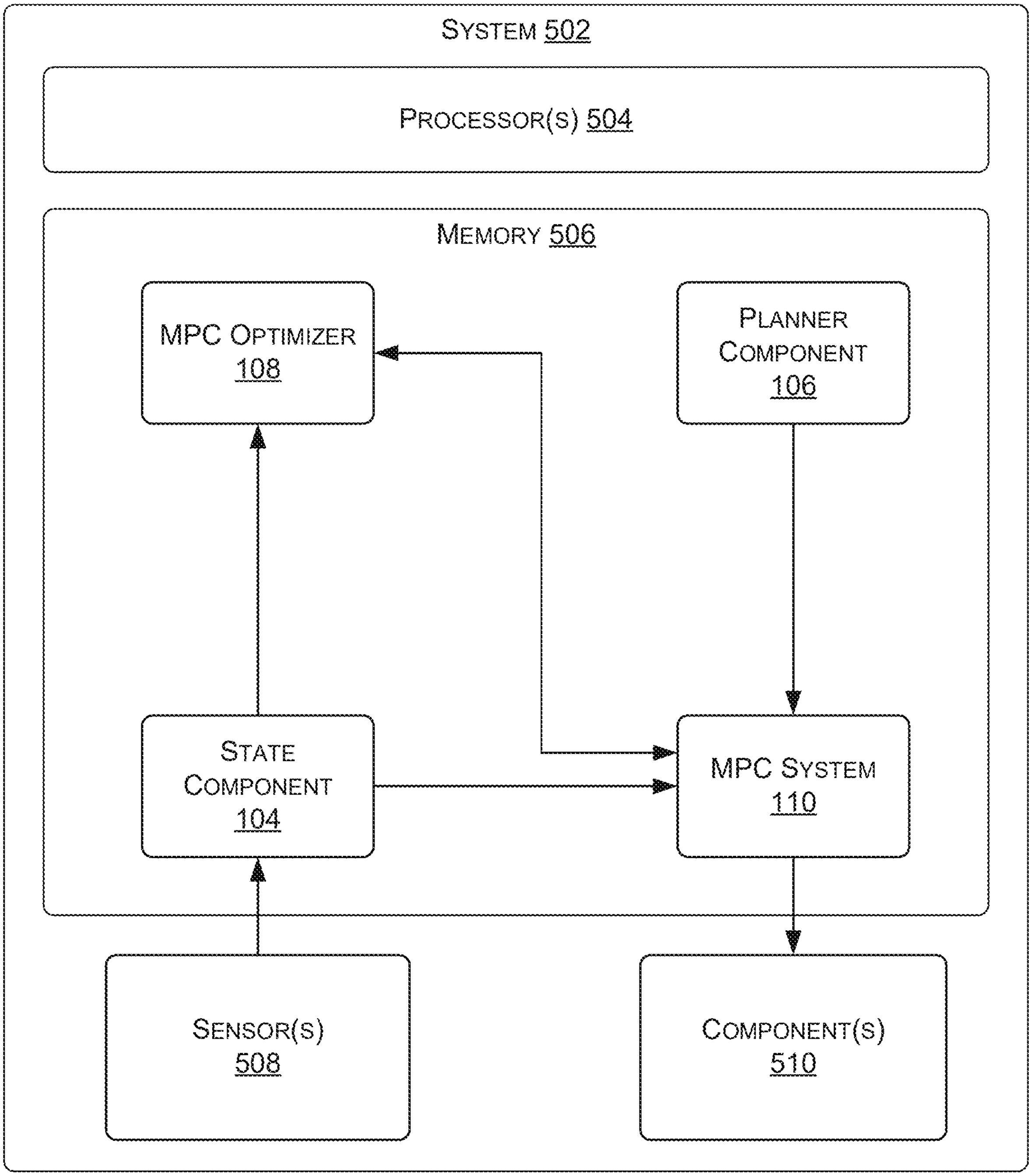
FIG. 5 illustrates an example of a system that may perform one or more of the processes described herein, in accordance with some embodiments of the present disclosure.

Referring now to FIG. 5, FIG. 5 illustrates an example of a system 502 that may perform one or more of the processes described herein, in accordance with some embodiments of the present disclosure. As shown, the system 502 (which may represent, and/or include, the example computing device(s) 1000 and/or the example data center 1100) may include one or more processors 504 (which may be similar to, and/or include, the CPUs 1006 and/or the GPUs 1008) and memory 506 (which may be similar to, and/or include, the memory 1004). For instance, the memory 506 may store one or more of the state component 104, the planner component 106, the MPC optimizer 108, and/or the MPC system 110. Additionally, the processor(s) 504 may execute one or more of the state component 104, the planner component 106, the MPC optimizer 108, and/or the MPC system 110 to perform one or more of the processes described herein.

For instance, the state component 104 may receive sensor data from the sensor(s) 508 (which may correspond to the sensor(s) 102), and use the sensor data to determine a measured state associated with the system 502. These measured states may be provided to the MPC optimizer 108 and the MPC system 110. The planner component 106 may provide, as input to the MPC system 110, a planned trajectory, path, operation, or any other planned objectives for the system 502. The MPC system 110 may use the measured states and the data received from the planner component to determine various control commands or control inputs to provide to one or more components 510 of the system 502.

The component(s) 510 may, in some instances, correspond to the machine component(s) 112. By providing this information to the component(s) 510, the component(s) 510 may cause the system 502 to perform the planned operations or objectives.

Figure 6:
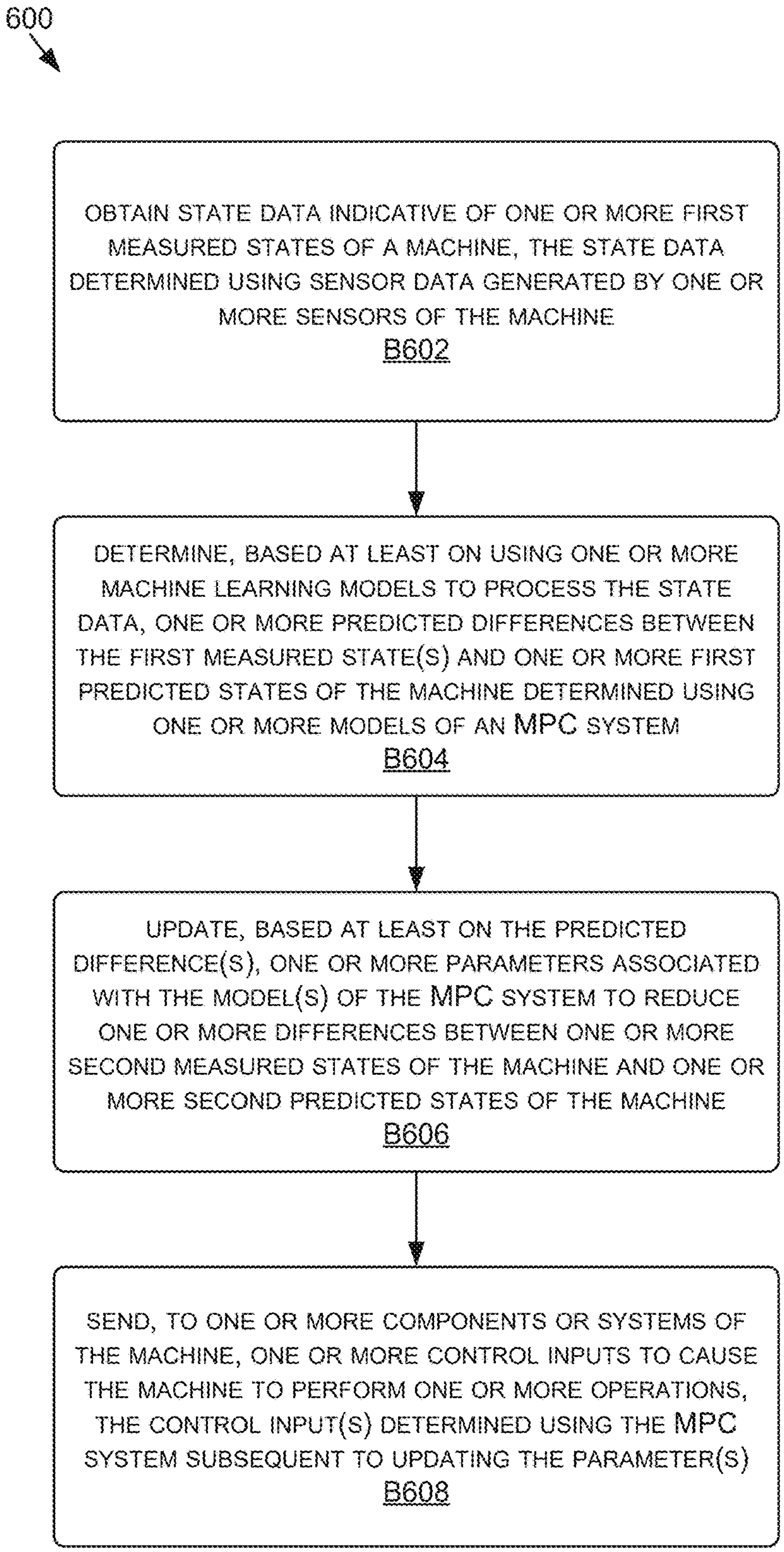
FIG. 6 is a flow diagram illustrating an example of a method for model-based supervision and refinement of a MPC system, in accordance with some embodiments of the present disclosure.
Figure 7:
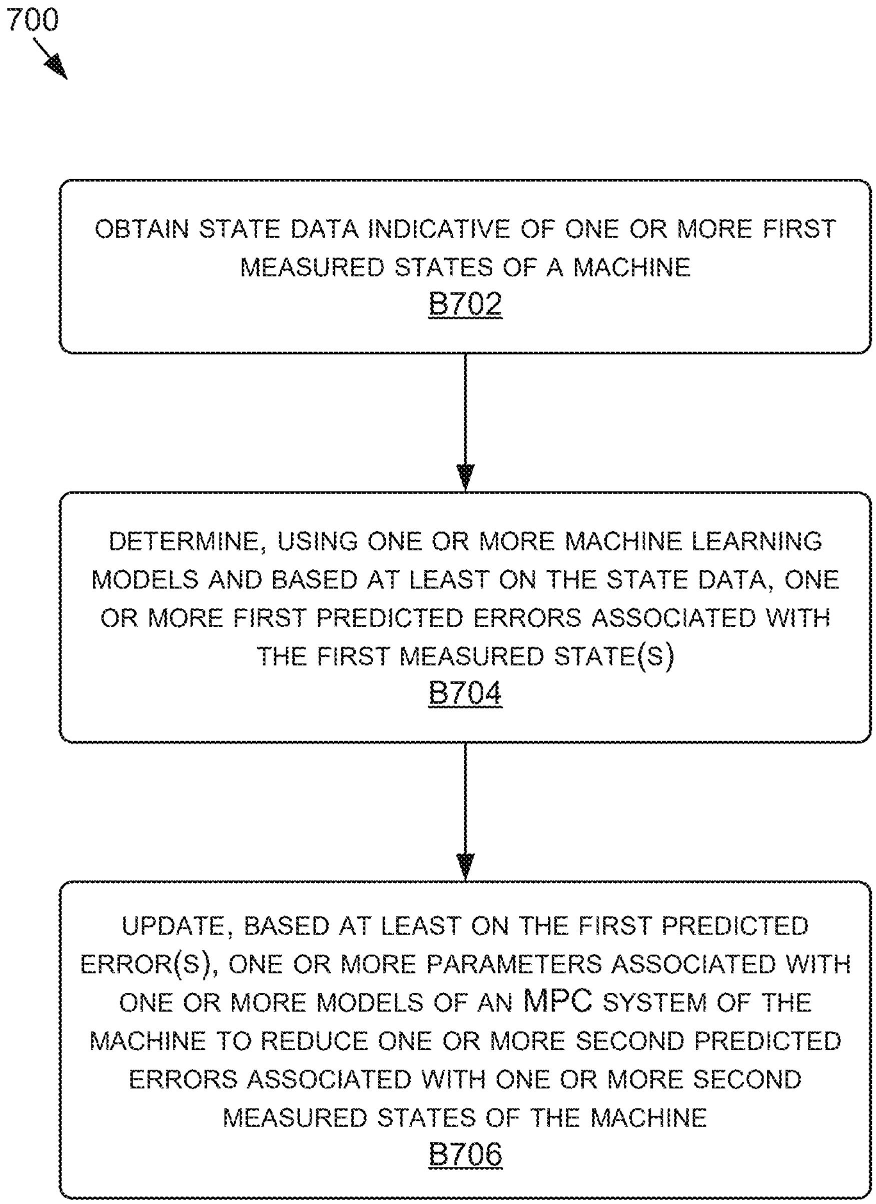
FIG. 7 is a flow diagram illustrating an example of a method for using machine learning models to update parameters of MPC system models, in accordance with some embodiments of the present disclosure.
Figure 8:
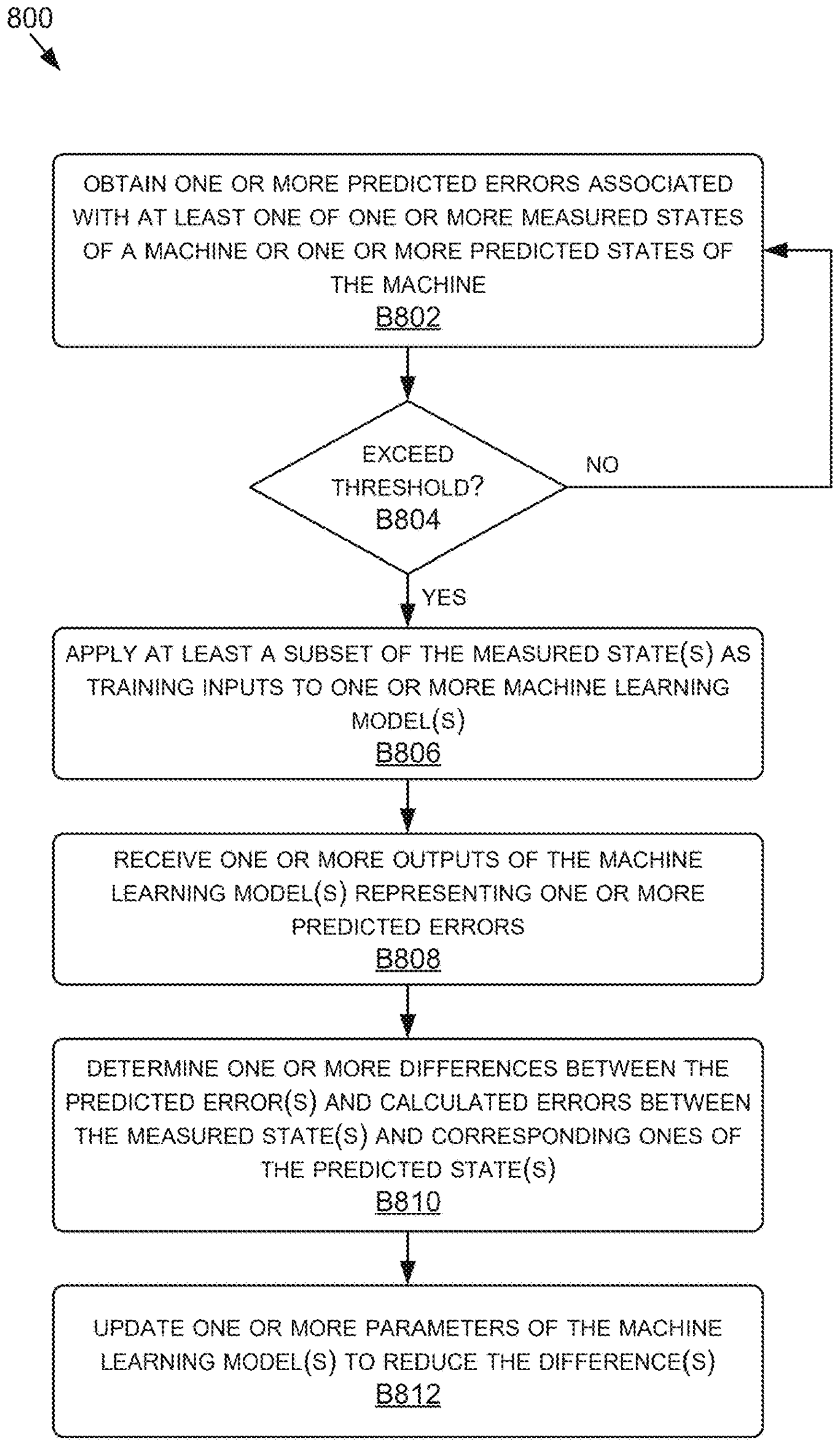
FIG. 8 is a flow diagram illustrating an example of a method for training or retraining machine learning models to predict errors between measured and predicted states of a machine for refining MPC systems models, in accordance with some embodiments of the present disclosure.

Now referring to FIGS. 6-8, each block of methods 600, 700, and 800, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 600, 700, and 800 are described, by way of example, with respect to FIG. 1. However, these methods may additionally or alternatively be executed by any one system, or any combination of systems, including, but not limited to, those described herein.

FIG. 6 is a flow diagram illustrating an example of a method 600 for model-based supervision and refinement of a MPC system, in accordance with some embodiments of the present disclosure. The method 600, at block B602, may include obtaining state data indicative of one or more first measured states of a machine, the state data determined using sensor data generated by one or more sensors of the machine. For instance, the MPC optimization system 108 may obtain the state data 124 indicative of the first measured state(s) of the machine. Additionally, in some instances the state data 124 may be determined by the state component 104 using the sensor data 122 generated by the sensor(s) 102.

The method 600, at block B604, may include determining, based at least on using one or more machine learning models to process the state data, one or more predicted differences between the first measured state(s) and one or more first predicted states of the machine determined using one or more models of an MPC system. For instance, the MPC optimization system 108 may use the machine learning model(s) 116 to process the state data 124 and determine the predicted difference(s) between the first measured state(s) and the first predicted state(s) of the machine determined using the predictive model(s) 120 of the MPC system 110.

The method 600, at block B606, may include updating, based at least on the predicted difference(s), one or more parameters associated with the model(s) of the MPC system to reduce one or more differences between one or more second measured states of the machine and one or more second predicted states of the machine. For instance, the MPC optimization system 108 may update the parameter(s) associated with the predictive model(s) 120 of the MPC system 110 using the disturbance data 128. That is, the MPC optimization system 108 may update a disturbance vector or other equations, inputs, factors, matrices, etc. associated with the predictive model(s) 120.

The method 600, at block B608, may include sending, to one or more components or systems of the machine, one or more control inputs to cause the machine to perform one or more operations, the control input(s) determined using the MPC system subsequent to updating the parameter(s). For instance, the MPC system 110 may send, to the machine component(s) 112, the control input(s) 130 determined using the MPC system 110 subsequent to the updating to cause the machine to perform the operation(s).

FIG. 7 is a flow diagram illustrating an example of a method 700 for using machine learning models to update parameters of MPC system models, in accordance with some embodiments of the present disclosure. The method 700, at block B702, may include obtaining state data indicative of one or more first measured states of a machine. For instance, the MPC optimization system 108 may obtain the state data 124 indicative of the first measured state(s) of the machine.

The method 700, at block B704, may include determining, using one or more machine learning models and based at least on the state data, one or more first predicted errors associated with the first measured state(s). For instance, the MPC optimization system 108 may determine the first predicted error(s) associated with the first measured state(s) using the machine learning model(s) 116 and based at least on the state data 124. For instance, the machine learning model(s) 116 may process the state data 124 to determine the first predicted error(s).

The method 700, at block B706, may include updating, based at least on the first predicted error(s), one or more parameters associated with one or more models of an MPC system of the machine to reduce one or more second predicted errors associated with one or more second measured states of the machine. For instance, the MPC optimization system 108 may update the parameter(s) associated with the predictive model(s) 120 of the MPC system 110 to reduce the second predicted error(s) associated with the second measured state(s) of the machine. In some examples, updating the parameters may include updating a disturbance vector of the predictive model(s) 120 to include the disturbance data 128.

FIG. 8 is a flow diagram illustrating an example of a method 800 for training or retraining machine learning models to predict errors between measured and predicted states of a machine for refining MPC systems models, in accordance with some embodiments of the present disclosure. In some examples, the method 800 may be performed online (e.g., while the machine is operating and traversing an environment). In additional or alternative examples, the method 800 may be performed offline while the machine is inoperative.

The method 800, at block B802, may include obtaining one or more predicted errors associated with at least one of one or more measured states of a machine or one or more predicted states of the machine. For instance, the model learner 114 may obtain the predicted error(s) associated with the measured state(s) or the predicted state(s) of the machine. The predicted error(s) may be determined using the machine learning model(s) 116, in some instances.

The method 800, at block B804, may include determining whether one or magnitude(s) of the predicted error(s) meet or exceed a threshold. For instance, the model learner 114 may determine whether the magnitude(s) of the predicted error(s) meet or exceed the threshold. If the magnitude(s) of the predicted error(s) meet or exceed the threshold, the method 800 may proceed to block B806. Otherwise, if the magnitude(s) of the predicted error(s) are less than the threshold, the method 800 may proceed back to block B802 for the next iteration or state of the MPC system.

The method 800, at block B806, may include applying at least a subset of the measured state(s) as training inputs to one or more machine learning model(s). For instance, the model learner 114 may apply the subset of the measured state(s) (e.g., a subset of the state data 124) as the training inputs to the machine learning model(s) 116.

The method 800, at block B808, may include receiving one or more outputs of the machine learning model(s) representing one or more predicted errors. For instance, the model learner 114 may receive the output(s) of the machine learning model(s) 116 representing the predicted error(s). In some examples, the predicted error(s) may represent predicted differences between the measured states of the machine and the predicted states of the machine determined by the MPC system 110.

The method 800, at block B810, may include determining one or more differences between the predicted error(s) and calculated errors between the measured state(s) and corresponding ones of the predicted state(s). For instance, the model learner 114 may determine the difference(s) between the predicted error(s) and the calculated errors between the measured state(s) and the corresponding predicted state(s) (e.g., the measured and predicted states for the same time steps).

The method 800, at block B812, may include updating one or more parameters of the machine learning model(s) to reduce the difference(s). For instance, the model learner 114 may update the parameter(s) of the machine learning model(s) 116 to reduce the difference(s). In this way, the machine learning model(s) 116 may be optimized to more accurately predict errors between the predicted and measured states. By doing this, the MPC optimization system 108 may better optimize the predictive model(s) of the MPC system 110, allowing the MPC system 110 to improve the performance of the machine by determining better control inputs.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, systems or application using model predictive control, data center processing, conversational AI, light transport simulation (e.g., ray tracing, path tracing, etc.), collaborative content creation for 3D assets, cloud computing, generative AI, (large) language models, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for model predictive control or implementing model predictive control, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, systems for performing generative AI operations, systems implementing—or for performing operations using—a large language model (LLM), and/or other types of systems.

Example Autonomous Vehicle

Figure 9A:
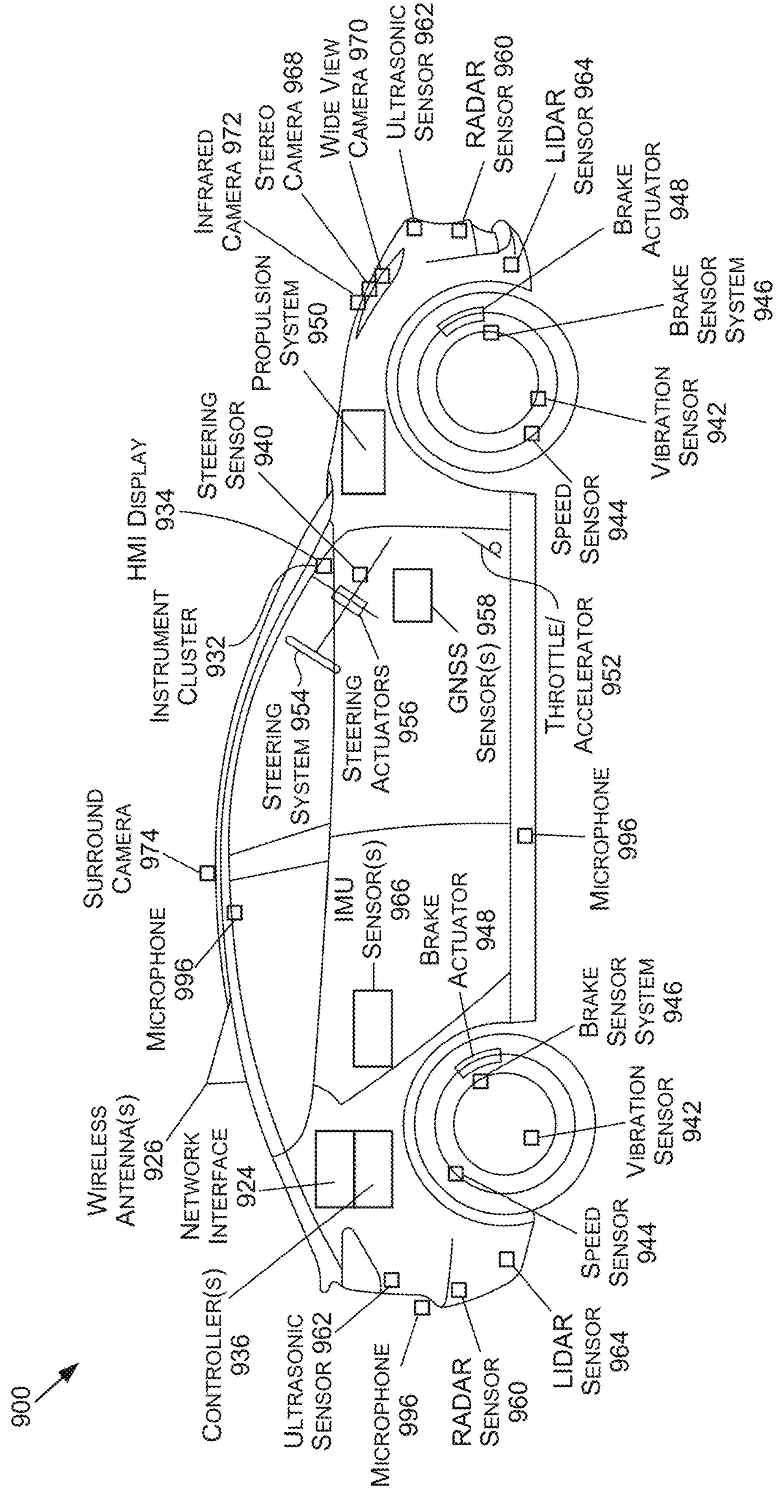
FIG. 9A is an illustration of an example autonomous vehicle, in accordance with some embodiments of the present disclosure.

FIG. 9A is an illustration of an example autonomous vehicle 900, in accordance with some embodiments of the present disclosure. The autonomous vehicle 900 (alternatively referred to herein as the "vehicle 900") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 900 may be capable of functionality in accordance with one or more of Level 3-Level 5 of the autonomous driving levels. The vehicle 900 may be capable of functionality in accordance with one or more of Level 1-Level 5 of the autonomous driving levels. For example, the vehicle 900 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 900 or other machine, such as being fully autonomous, being highly autonomous, being conditionally autonomous, being partially autonomous, providing assistive autonomy, being semi-autonomous, being primarily autonomous, or other designation.

The vehicle 900 may include components such as a chassis, a vehicle body, wheels (e.g., 2, 4, 6, 8, 18, etc.), tires, axles, and other components of a vehicle. The vehicle 900 may include a propulsion system 950, such as an internal combustion engine, hybrid electric power plant, an all-electric engine, and/or another propulsion system type. The propulsion system 950 may be connected to a drive train of the vehicle 900, which may include a transmission, to enable the propulsion of the vehicle 900. The propulsion system 950 may be controlled in response to receiving signals from the throttle/accelerator 952.

A steering system 954, which may include a steering wheel, may be used to steer the vehicle 900 (e.g., along a desired path or route) when the propulsion system 950 is operating (e.g., when the vehicle is in motion). The steering system 954 may receive signals from a steering actuator 956. The steering wheel may be optional for full automation (Level 5) functionality.

The brake sensor system 946 may be used to operate the vehicle brakes in response to receiving signals from the brake actuators 948 and/or brake sensors.

Controller(s) 936, which may include one or more system on chips (SoCs) 904 (FIG. 9C) and/or GPU(s), may provide signals (e.g., representative of commands) to one or more components and/or systems of the vehicle 900. For example, the controller(s) may send signals to operate the vehicle brakes via one or more brake actuators 948, to operate the steering system 954 via one or more steering actuators 956, to operate the propulsion system 950 via one or more throttle/accelerators 952. The controller(s) 936 may include one or more onboard (e.g., integrated) computing devices (e.g., supercomputers) that process sensor signals, and output operation commands (e.g., signals representing commands) to enable autonomous driving and/or to assist a human driver in driving the vehicle 900. The controller(s) 936 may include a first controller 936 for autonomous driving functions, a second controller 936 for functional safety functions, a third controller 936 for artificial intelligence functionality (e.g., computer vision), a fourth controller 936 for infotainment functionality, a fifth controller 936 for redundancy in emergency conditions, and/or other controllers. In some examples, a single controller 936 may handle two or more of the above functionalities, two or more controllers 936 may handle a single functionality, and/or any combination thereof.

The controller(s) 936 may provide the signals for controlling one or more components and/or systems of the vehicle 900 in response to sensor data received from one or more sensors (e.g., sensor inputs). The sensor data may be received from, for example and without limitation, global navigation satellite systems ("GNSS") sensor(s) 958 (e.g., Global Positioning System sensor(s)), RADAR sensor(s) 960, ultrasonic sensor(s) 962, LIDAR sensor(s) 964, inertial measurement unit (IMU) sensor(s) 966 (e.g., accelerometer(s), gyroscope(s), magnetic compass(es), magnetometer(s), etc.), microphone(s) 996, stereo camera(s) 968, wide-view camera(s) 970 (e.g., fisheye cameras), infrared camera(s) 972, surround camera(s) 974 (e.g., 360 degree cameras), long-range and/or mid-range camera(s) 998, speed sensor(s) 944 (e.g., for measuring the speed of the vehicle 900), vibration sensor(s) 942, steering sensor(s) 940, brake sensor(s) (e.g., as part of the brake sensor system 946), and/or other sensor types.

One or more of the controller(s) 936 may receive inputs (e.g., represented by input data) from an instrument cluster 932 of the vehicle 900 and provide outputs (e.g., represented by output data, display data, etc.) via a human-machine interface (HMI) display 934, an audible annunciator, a loudspeaker, and/or via other components of the vehicle 900. The outputs may include information such as vehicle velocity, speed, time, map data (e.g., the High Definition ("HD") map 922 of FIG. 9C), location data (e.g., the vehicle's 900 location, such as on a map), direction, location of other vehicles (e.g., an occupancy grid), information about objects and status of objects as perceived by the controller(s) 936, etc. For example, the HMI display 934 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 900 further includes a network interface 924 which may use one or more wireless antenna(s) 926 and/or modem(s) to communicate over one or more networks. For example, the network interface 924 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 926 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 9B:
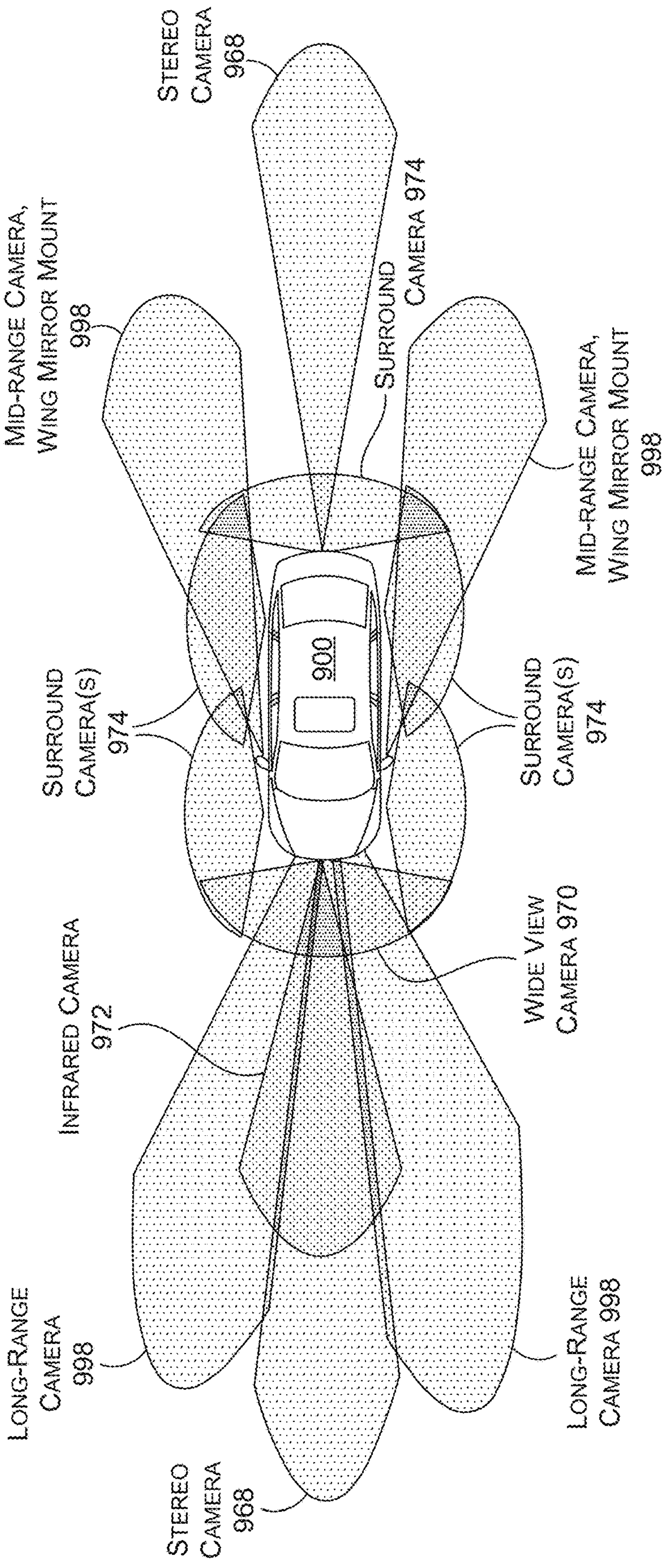
FIG. 9B is an example of camera locations and fields of view for the example autonomous vehicle of FIG. 9A, in accordance with some embodiments of the present disclosure.

FIG. 9B is an example of camera locations and fields of view for the example autonomous vehicle 900 of FIG. 9A, in accordance with some embodiments of the present disclosure. The cameras and respective fields of view are one example embodiment and are not intended to be limiting. For example, additional and/or alternative cameras may be included and/or the cameras may be located at different locations on the vehicle 900.

The camera types for the cameras may include, but are not limited to, digital cameras that may be adapted for use with the components and/or systems of the vehicle 900. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 900 (e.g., front-facing cameras) may be used for surround view, to help identify forward facing paths and obstacles, as well aid in, with the help of one or more controllers 936 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 970 that may be used to perceive objects coming into view from the periphery (e.g., pedestrians, crossing traffic or bicycles). Although only one wide-view camera is illustrated in FIG. 9B, there may be any number (including zero) of wide-view cameras 970 on the vehicle 900. In addition, any number of long-range camera(s) 998 (e.g., a long-view stereo camera pair) may be used for depth-based object detection, especially for objects for which a neural network has not yet been trained. The long-range camera(s) 998 may also be used for object detection and classification, as well as basic object tracking.

Any number of stereo cameras 968 may also be included in a front-facing configuration. In at least one embodiment, one or more of stereo camera(s) 968 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 968 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 968 may be used in addition to, or alternatively from, those described herein.

Cameras with a field of view that include portions of the environment to the side of the vehicle 900 (e.g., side-view cameras) may be used for surround view, providing information used to create and update the occupancy grid, as well as to generate side impact collision warnings. For example, surround camera(s) 974 (e.g., four surround cameras 974 as illustrated in FIG. 9B) may be positioned to on the vehicle 900. The surround camera(s) 974 may include wide-view camera(s) 970, fisheye camera(s), 360 degree camera(s), and/or the like. Four example, four fisheye cameras may be positioned on the vehicle's front, rear, and sides. In an alternative arrangement, the vehicle may use three surround camera(s) 974 (e.g., left, right, and rear), and may leverage one or more other camera(s) (e.g., a forward-facing camera) as a fourth surround view camera.

Cameras with a field of view that include portions of the environment to the rear of the vehicle 900 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 998, stereo camera(s) 968), infrared camera(s) 972, etc.), as described herein.

Figure 9C:
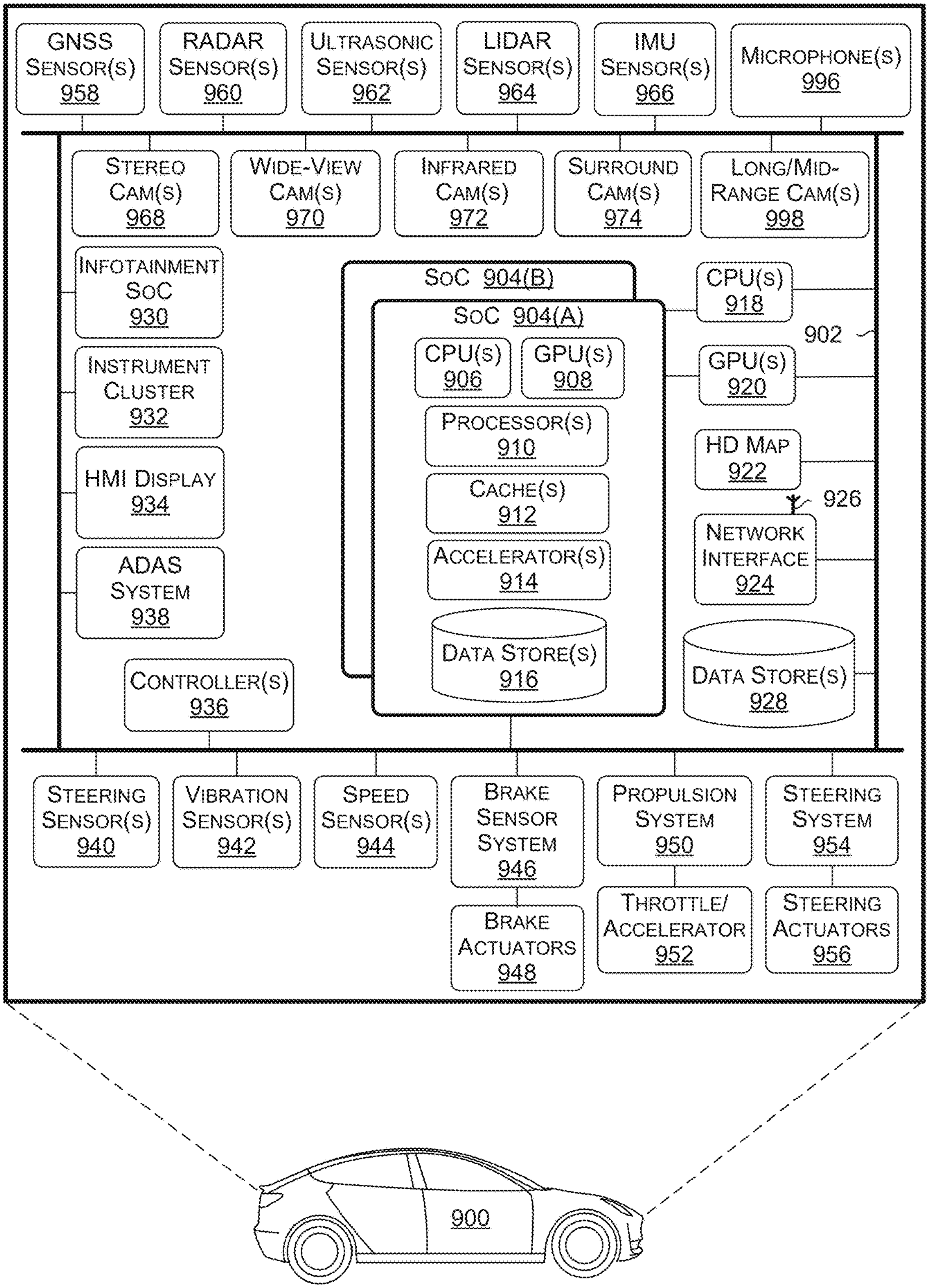
FIG. 9C is a block diagram of an example system architecture for the example autonomous vehicle of FIG. 9A, in accordance with some embodiments of the present disclosure.

FIG. 9C is a block diagram of an example system architecture for the example autonomous vehicle 900 of FIG. 9A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 900 in FIG. 9C are illustrated as being connected via bus 902. The bus 902 may include a Controller Area Network (CAN) data interface (alternatively referred to herein as a "CAN bus"). A CAN may be a network inside the vehicle 900 used to aid in control of various features and functionality of the vehicle 900, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 902 is described herein as being a CAN bus, this is not intended to be limiting. For example, in addition to, or alternatively from, the CAN bus, FlexRay and/or Ethernet may be used. Additionally, although a single line is used to represent the bus 902, this is not intended to be limiting. For example, there may be any number of busses 902, which may include one or more CAN busses, one or more FlexRay busses, one or more Ethernet busses, and/or one or more other types of busses using a different protocol. In some examples, two or more busses 902 may be used to perform different functions, and/or may be used for redundancy. For example, a first bus 902 may be used for collision avoidance functionality and a second bus 902 may be used for actuation control. In any example, each bus 902 may communicate with any of the components of the vehicle 900, and two or more busses 902 may communicate with the same components. In some examples, each SoC 904, each controller 936, and/or each computer within the vehicle may have access to the same input data (e.g., inputs from sensors of the vehicle 900), and may be connected to a common bus, such the CAN bus.

The vehicle 900 may include one or more controller(s) 936, such as those described herein with respect to FIG. 9A. The controller(s) 936 may be used for a variety of functions. The controller(s) 936 may be coupled to any of the various other components and systems of the vehicle 900, and may be used for control of the vehicle 900, artificial intelligence of the vehicle 900, infotainment for the vehicle 900, and/or the like.

The vehicle 900 may include a system(s) on a chip (SoC) 904. The SoC 904 may include CPU(s) 906, GPU(s) 908, processor(s) 910, cache(s) 912, accelerator(s) 914, data store(s) 916, and/or other components and features not illustrated. The SoC(s) 904 may be used to control the vehicle 900 in a variety of platforms and systems. For example, the SoC(s) 904 may be combined in a system (e.g., the system of the vehicle 900) with an HD map 922 which may obtain map refreshes and/or updates via a network interface 924 from one or more servers (e.g., server(s) 978 of FIG. 9D).

The CPU(s) 906 may include a CPU cluster or CPU complex (alternatively referred to herein as a "CCPLEX"). The CPU(s) 906 may include multiple cores and/or L2 caches. For example, in some embodiments, the CPU(s) 906 may include eight cores in a coherent multi-processor configuration. In some embodiments, the CPU(s) 906 may include four dual-core clusters where each cluster has a dedicated L2 cache (e.g., a 2 MB L2 cache). The CPU(s) 906 (e.g., the CCPLEX) may be configured to support simultaneous cluster operation enabling any combination of the clusters of the CPU(s) 906 to be active at any given time.

The CPU(s) 906 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 906 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 908 may include an integrated GPU (alternatively referred to herein as an "iGPU"). The GPU(s) 908 may be programmable and may be efficient for parallel workloads. The GPU(s) 908, in some examples, may use an enhanced tensor instruction set. The GPU(s) 908 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 908 may include at least eight streaming microprocessors. The GPU(s) 908 may use compute application programming interface(s) (API(s)). In addition, the GPU(s) 908 may use one or more parallel computing platforms and/or programming models (e.g., NVIDIA's CUDA).

The GPU(s) 908 may be power-optimized for best performance in automotive and embedded use cases. For example, the GPU(s) 908 may be fabricated on a Fin field-effect transistor (FinFET). However, this is not intended to be limiting and the GPU(s) 908 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 908 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 908 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 908 to access the CPU(s) 906 page tables directly. In such examples, when the GPU(s) 908 memory management unit (MMU) experiences a miss, an address translation request may be transmitted to the CPU(s) 906. In response, the CPU(s) 906 may look in its page tables for the virtual-to-physical mapping for the address and transmits the translation back to the GPU(s) 908. As such, unified memory technology may allow a single unified virtual address space for memory of both the CPU(s) 906 and the GPU(s) 908, thereby simplifying the GPU(s) 908 programming and porting of applications to the GPU(s) 908.

In addition, the GPU(s) 908 may include an access counter that may keep track of the frequency of access of the GPU(s) 908 to memory of other processors. The access counter may help ensure that memory pages are moved to the physical memory of the processor that is accessing the pages most frequently.

The SoC(s) 904 may include any number of cache(s) 912, including those described herein. For example, the cache(s) 912 may include an L3 cache that is available to both the CPU(s) 906 and the GPU(s) 908 (e.g., that is connected both the CPU(s) 906 and the GPU(s) 908). The cache(s) 912 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 904 may include an arithmetic logic unit(s) (ALU(s)) which may be leveraged in performing processing with respect to any of the variety of tasks or operations of the vehicle 900—such as processing DNNs. In addition, the SoC(s) 904 may include a floating point unit(s) (FPU(s))—or other math coprocessor or numeric coprocessor types—for performing mathematical operations within the system. For example, the SoC(s) 904 may include one or more FPUs integrated as execution units within a CPU(s) 906 and/or GPU(s) 908.

The SoC(s) 904 may include one or more accelerators 914 (e.g., hardware accelerators, software accelerators, or a combination thereof). For example, the SoC(s) 904 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 908 and to off-load some of the tasks of the GPU(s) 908 (e.g., to free up more cycles of the GPU(s) 908 for performing other tasks). As an example, the accelerator(s) 914 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 914 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 908, and by using an inference accelerator, for example, a designer may target either the DLA(s) or the GPU(s) 908 for any function. For example, the designer may focus processing of CNNs and floating point operations on the DLA(s) and leave other functions to the GPU(s) 908 and/or other accelerator(s) 914.

The accelerator(s) 914 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 906. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 914 (e.g., the hardware acceleration cluster) may include a computer vision network on-chip and SRAM, for providing a high-bandwidth, low latency SRAM for the accelerator(s) 914. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 904 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 914 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 966 output that correlates with the vehicle 900 orientation, distance, 3D location estimates of the object obtained from the neural network and/or other sensors (e.g., LIDAR sensor(s) 964 or RADAR sensor(s) 960), among others.

The SoC(s) 904 may include data store(s) 916 (e.g., memory). The data store(s) 916 may be on-chip memory of the SoC(s) 904, which may store neural networks to be executed on the GPU and/or the DLA. In some examples, the data store(s) 916 may be large enough in capacity to store multiple instances of neural networks for redundancy and safety. The data store(s) 912 may comprise L2 or L3 cache(s) 912. Reference to the data store(s) 916 may include reference to the memory associated with the PVA, DLA, and/or other accelerator(s) 914, as described herein.

The SoC(s) 904 may include one or more processor(s) 910 (e.g., embedded processors). The processor(s) 910 may include a boot and power management processor that may be a dedicated processor and subsystem to handle boot power and management functions and related security enforcement. The boot and power management processor may be a part of the SoC(s) 904 boot sequence and may provide runtime power management services. The boot power and management processor may provide clock and voltage programming, assistance in system low power state transitions, management of SoC(s) 904 thermals and temperature sensors, and/or management of the SoC(s) 904 power states. Each temperature sensor may be implemented as a ring-oscillator whose output frequency is proportional to temperature, and the SoC(s) 904 may use the ring-oscillators to detect temperatures of the CPU(s) 906, GPU(s) 908, and/or accelerator(s) 914. If temperatures are determined to exceed a threshold, the boot and power management processor may enter a temperature fault routine and put the SoC(s) 904 into a lower power state and/or put the vehicle 900 into a chauffeur to safe stop mode (e.g., bring the vehicle 900 to a safe stop).

The processor(s) 910 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 910 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 910 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 910 may further include a real-time camera engine that may include a dedicated processor subsystem for handling real-time camera management.

The processor(s) 910 may further include a high-dynamic range signal processor that may include an image signal processor that is a hardware engine that is part of the camera processing pipeline.

The processor(s) 910 may include a video image compositor that may be a processing block (e.g., implemented on a microprocessor) that implements video post-processing functions needed by a video playback application to produce the final image for the player window. The video image compositor may perform lens distortion correction on wide-view camera(s) 970, surround camera(s) 974, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 908 is not required to continuously render new surfaces. Even when the GPU(s) 908 is powered on and active doing 3D rendering, the video image compositor may be used to offload the GPU(s) 908 to improve performance and responsiveness.

The SoC(s) 904 may further include a mobile industry processor interface (MIPI) camera serial interface for receiving video and input from cameras, a high-speed interface, and/or a video input block that may be used for camera and related pixel input functions. The SoC(s) 904 may further include an input/output controller(s) that may be controlled by software and may be used for receiving I/O signals that are uncommitted to a specific role.

The SoC(s) 904 may further include a broad range of peripheral interfaces to enable communication with peripherals, audio codecs, power management, and/or other devices. The SoC(s) 904 may be used to process data from cameras (e.g., connected over Gigabit Multimedia Serial Link and Ethernet), sensors (e.g., LIDAR sensor(s) 964, RADAR sensor(s) 960, etc. that may be connected over Ethernet), data from bus 902 (e.g., speed of vehicle 900, steering wheel position, etc.), data from GNSS sensor(s) 958 (e.g., connected over Ethernet or CAN bus). The SoC(s) 904 may further include dedicated high-performance mass storage controllers that may include their own DMA engines, and that may be used to free the CPU(s) 906 from routine data management tasks.

The SoC(s) 904 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 904 may be faster, more reliable, and even more energy-efficient and space-efficient than conventional systems. For example, the accelerator(s) 914, when combined with the CPU(s) 906, the GPU(s) 908, and the data store(s) 916, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 920) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 908.

In some examples, a CNN for facial recognition and vehicle owner identification may use data from camera sensors to identify the presence of an authorized driver and/or owner of the vehicle 900. The always on sensor processing engine may be used to unlock the vehicle when the owner approaches the driver door and turn on the lights, and, in security mode, to disable the vehicle when the owner leaves the vehicle. In this way, the SoC(s) 904 provide for security against theft and/or carjacking.

In another example, a CNN for emergency vehicle detection and identification may use data from microphones 996 to detect and identify emergency vehicle sirens. In contrast to conventional systems, that use general classifiers to detect sirens and manually extract features, the SoC(s) 904 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 958. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 962, until the emergency vehicle(s) passes.

The vehicle may include a CPU(s) 918 (e.g., discrete CPU(s), or dCPU(s)), that may be coupled to the SoC(s) 904 via a high-speed interconnect (e.g., PCIe). The CPU(s) 918 may include an X86 processor, for example. The CPU(s) 918 may be used to perform any of a variety of functions, including arbitrating potentially inconsistent results between ADAS sensors and the SoC(s) 904, and/or monitoring the status and health of the controller(s) 936 and/or infotainment SoC 930, for example.

The vehicle 900 may include a GPU(s) 920 (e.g., discrete GPU(s), or dGPU(s)), that may be coupled to the SoC(s) 904 via a high-speed interconnect (e.g., NVIDIA's NVLINK). The GPU(s) 920 may provide additional artificial intelligence functionality, such as by executing redundant and/or different neural networks, and may be used to train and/or update neural networks based on input (e.g., sensor data) from sensors of the vehicle 900.

The vehicle 900 may further include the network interface 924 which may include one or more wireless antennas 926 (e.g., one or more wireless antennas for different communication protocols, such as a cellular antenna, a Bluetooth antenna, etc.). The network interface 924 may be used to enable wireless connectivity over the Internet with the cloud (e.g., with the server(s) 978 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 900 information about vehicles in proximity to the vehicle 900 (e.g., vehicles in front of, on the side of, and/or behind the vehicle 900). This functionality may be part of a cooperative adaptive cruise control functionality of the vehicle 900.

The network interface 924 may include a SoC that provides modulation and demodulation functionality and enables the controller(s) 936 to communicate over wireless networks. The network interface 924 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 900 may further include data store(s) 928 which may include off-chip (e.g., off the SoC(s) 904) storage. The data store(s) 928 may include one or more storage elements including RAM, SRAM, DRAM, VRAM, Flash, hard disks, and/or other components and/or devices that may store at least one bit of data.

The vehicle 900 may further include GNSS sensor(s) 958. The GNSS sensor(s) 958 (e.g., GPS, assisted GPS sensors, differential GPS (DGPS) sensors, etc.), to assist in mapping, perception, occupancy grid generation, and/or path planning functions. Any number of GNSS sensor(s) 958 may be used, including, for example and without limitation, a GPS using a USB connector with an Ethernet to Serial (RS-232) bridge.

The vehicle 900 may further include RADAR sensor(s) 960. The RADAR sensor(s) 960 may be used by the vehicle 900 for long-range vehicle detection, even in darkness and/or severe weather conditions. RADAR functional safety levels may be ASIL B. The RADAR sensor(s) 960 may use the CAN and/or the bus 902 (e.g., to transmit data generated by the RADAR sensor(s) 960) for control and to access object tracking data, with access to Ethernet to access raw data in some examples. A wide variety of RADAR sensor types may be used. For example, and without limitation, the RADAR sensor(s) 960 may be suitable for front, rear, and side RADAR use. In some example, Pulse Doppler RADAR sensor(s) are used.

The RADAR sensor(s) 960 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 960 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 900 surroundings at higher speeds with minimal interference from traffic in adjacent lanes. The other two antennae may expand the field of view, making it possible to quickly detect vehicles entering or leaving the vehicle's 900 lane.

Mid-range RADAR systems may include, as an example, a range of up to 960 m (front) or 80 m (rear), and a field of view of up to 42 degrees (front) or 950 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 900 may further include ultrasonic sensor(s) 962. The ultrasonic sensor(s) 962, which may be positioned at the front, back, and/or the sides of the vehicle 900, may be used for park assist and/or to create and update an occupancy grid. A wide variety of ultrasonic sensor(s) 962 may be used, and different ultrasonic sensor(s) 962 may be used for different ranges of detection (e.g., 2.5 m, 4 m). The ultrasonic sensor(s) 962 may operate at functional safety levels of ASIL B.

The vehicle 900 may include LIDAR sensor(s) 964. The LIDAR sensor(s) 964 may be used for object and pedestrian detection, emergency braking, collision avoidance, and/or other functions. The LIDAR sensor(s) 964 may be functional safety level ASIL B. In some examples, the vehicle 900 may include multiple LIDAR sensors 964 (e.g., two, four, six, etc.) that may use Ethernet (e.g., to provide data to a Gigabit Ethernet switch).

In some examples, the LIDAR sensor(s) 964 may be capable of providing a list of objects and their distances for a 360-degree field of view. Commercially available LIDAR sensor(s) 964 may have an advertised range of approximately 900 m, with an accuracy of 2 cm-3 cm, and with support for a 900 Mbps Ethernet connection, for example. In some examples, one or more non-protruding LIDAR sensors 964 may be used. In such examples, the LIDAR sensor(s) 964 may be implemented as a small device that may be embedded into the front, rear, sides, and/or corners of the vehicle 900. The LIDAR sensor(s) 964, in such examples, may provide up to a 120-degree horizontal and 35-degree vertical field-of-view, with a 200 m range even for low-reflectivity objects. Front-mounted LIDAR sensor(s) 964 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 900. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 964 may be less susceptible to motion blur, vibration, and/or shock.

The vehicle may further include IMU sensor(s) 966. The IMU sensor(s) 966 may be located at a center of the rear axle of the vehicle 900, in some examples. The IMU sensor(s) 966 may include, for example and without limitation, an accelerometer(s), a magnetometer(s), a gyroscope(s), a magnetic compass(es), and/or other sensor types. In some examples, such as in six-axis applications, the IMU sensor(s) 966 may include accelerometers and gyroscopes, while in nine-axis applications, the IMU sensor(s) 966 may include accelerometers, gyroscopes, and magnetometers.

In some embodiments, the IMU sensor(s) 966 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 966 may enable the vehicle 900 to estimate heading without requiring input from a magnetic sensor by directly observing and correlating the changes in velocity from GPS to the IMU sensor(s) 966. In some examples, the IMU sensor(s) 966 and the GNSS sensor(s) 958 may be combined in a single integrated unit.

The vehicle may include microphone(s) 996 placed in and/or around the vehicle 900. The microphone(s) 996 may be used for emergency vehicle detection and identification, among other things.

The vehicle may further include any number of camera types, including stereo camera(s) 968, wide-view camera(s) 970, infrared camera(s) 972, surround camera(s) 974, long-range and/or mid-range camera(s) 998, and/or other camera types. The cameras may be used to capture image data around an entire periphery of the vehicle 900. The types of cameras used depends on the embodiments and requirements for the vehicle 900, and any combination of camera types may be used to provide the necessary coverage around the vehicle 900. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 9A and FIG. 9B.

The vehicle 900 may further include vibration sensor(s) 942. The vibration sensor(s) 942 may measure vibrations of components of the vehicle, such as the axle(s). For example, changes in vibrations may indicate a change in road surfaces. In another example, when two or more vibration sensors 942 are used, the differences between the vibrations may be used to determine friction or slippage of the road surface (e.g., when the difference in vibration is between a power-driven axle and a freely rotating axle).

The vehicle 900 may include an ADAS system 938. The ADAS system 938 may include a SoC, in some examples. The ADAS system 938 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 960, LIDAR sensor(s) 964, and/or a camera(s). The ACC systems may include longitudinal ACC and/or lateral ACC. Longitudinal ACC monitors and controls the distance to the vehicle immediately ahead of the vehicle 900 and automatically adjust the vehicle speed to maintain a safe distance from vehicles ahead. Lateral ACC performs distance keeping, and advises the vehicle 900 to change lanes when necessary. Lateral ACC is related to other ADAS applications such as LCA and CWS.

CACC uses information from other vehicles that may be received via the network interface 924 and/or the wireless antenna(s) 926 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 900), while the I2V communication concept provides information about traffic further ahead. CACC systems may include either or both I2V and V2V information sources. Given the information of the vehicles ahead of the vehicle 900, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 960, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 960, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 900 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 900 if the vehicle 900 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 960, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 900 is backing up. Some RCTW systems include AEB to ensure that the vehicle brakes are applied to avoid a crash. RCTW systems may use one or more rear-facing RADAR sensor(s) 960, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 900, the vehicle 900 itself must, in the case of conflicting results, decide whether to heed the result from a primary computer or a secondary computer (e.g., a first controller 936 or a second controller 936). For example, in some embodiments, the ADAS system 938 may be a backup and/or secondary computer for providing perception information to a backup computer rationality module. The backup computer rationality monitor may run a redundant diverse software on hardware components to detect faults in perception and dynamic driving tasks. Outputs from the ADAS system 938 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 904.

In other examples, ADAS system 938 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 938 may be fed into the primary computer's perception block and/or the primary computer's dynamic driving task block. For example, if the ADAS system 938 indicates a forward crash warning due to an object immediately ahead, the perception block may use this information when identifying objects. In other examples, the secondary computer may have its own neural network which is trained and thus reduces the risk of false positives, as described herein.

The vehicle 900 may further include the infotainment SoC 930 (e.g., an in-vehicle infotainment system (IVI)). Although illustrated and described as a SoC, the infotainment system may not be a SoC, and may include two or more discrete components. The infotainment SoC 930 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 900. For example, the infotainment SoC 930 may radios, disk players, navigation systems, video players, USB and Bluetooth connectivity, carputers, in-car entertainment, Wi-Fi, steering wheel audio controls, hands free voice control, a heads-up display (HUD), an HMI display 934, a telematics device, a control panel (e.g., for controlling and/or interacting with various components, features, and/or systems), and/or other components. The infotainment SoC 930 may further be used to provide information (e.g., visual and/or audible) to a user(s) of the vehicle, such as information from the ADAS system 938, autonomous driving information such as planned vehicle maneuvers, trajectories, surrounding environment information (e.g., intersection information, vehicle information, road information, etc.), and/or other information.

The infotainment SoC 930 may include GPU functionality. The infotainment SoC 930 may communicate over the bus 902 (e.g., CAN bus, Ethernet, etc.) with other devices, systems, and/or components of the vehicle 900. In some examples, the infotainment SoC 930 may be coupled to a supervisory MCU such that the GPU of the infotainment system may perform some self-driving functions in the event that the primary controller(s) 936 (e.g., the primary and/or backup computers of the vehicle 900) fail. In such an example, the infotainment SoC 930 may put the vehicle 900 into a chauffeur to safe stop mode, as described herein.

The vehicle 900 may further include an instrument cluster 932 (e.g., a digital dash, an electronic instrument cluster, a digital instrument panel, etc.). The instrument cluster 932 may include a controller and/or supercomputer (e.g., a discrete controller or supercomputer). The instrument cluster 932 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 930 and the instrument cluster 932. In other words, the instrument cluster 932 may be included as part of the infotainment SoC 930, or vice versa.

Figure 9D:
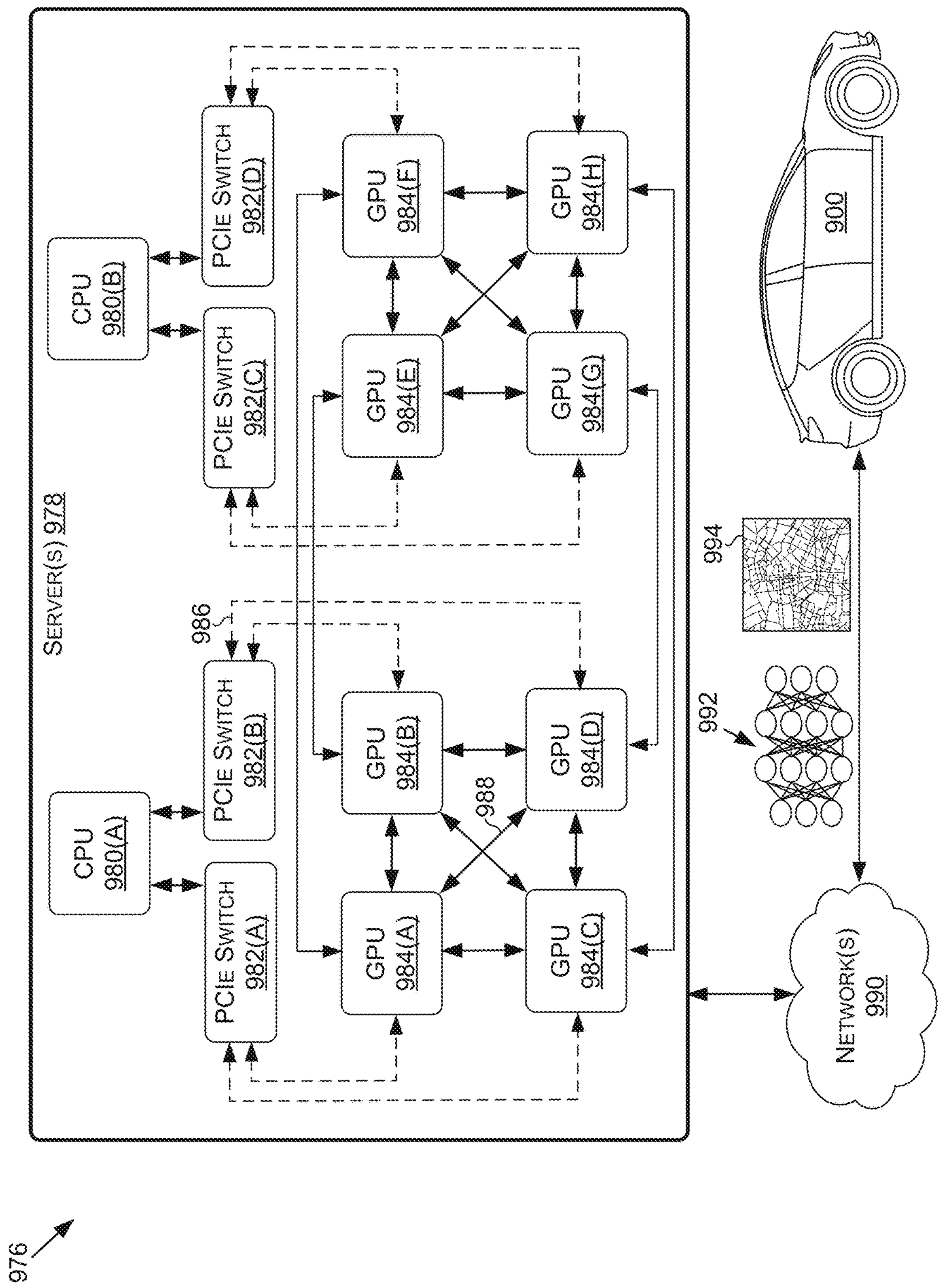
FIG. 9D is a system diagram for communication between cloud-based server(s) and the example autonomous vehicle of FIG. 9A, in accordance with some embodiments of the present disclosure.

FIG. 9D is a system diagram for communication between cloud-based server(s) and the example autonomous vehicle 900 of FIG. 9A, in accordance with some embodiments of the present disclosure. The system 976 may include server(s) 978, network(s) 990, and vehicles, including the vehicle 900. The server(s) 978 may include a plurality of GPUs 984(A)-984(H) (collectively referred to herein as GPUs 984), PCIe switches 982(A)-982(H) (collectively referred to herein as PCIe switches 982), and/or CPUs 980(A)-980(B) (collectively referred to herein as CPUs 980). The GPUs 984, the CPUs 980, and the PCIe switches may be interconnected with high-speed interconnects such as, for example and without limitation, NVLink interfaces 988 developed by NVIDIA and/or PCIe connections 986. In some examples, the GPUs 984 are connected via NVLink and/or NVSwitch SoC and the GPUs 984 and the PCIe switches 982 are connected via PCIe interconnects. Although eight GPUs 984, two CPUs 980, and two PCIe switches are illustrated, this is not intended to be limiting. Depending on the embodiment, each of the server(s) 978 may include any number of GPUs 984, CPUs 980, and/or PCIe switches. For example, the server(s) 978 may each include eight, sixteen, thirty-two, and/or more GPUs 984.

The server(s) 978 may receive, over the network(s) 990 and from the vehicles, image data representative of images showing unexpected or changed road conditions, such as recently commenced road-work. The server(s) 978 may transmit, over the network(s) 990 and to the vehicles, neural networks 992, updated neural networks 992, and/or map information 994, including information regarding traffic and road conditions. The updates to the map information 994 may include updates for the HD map 922, such as information regarding construction sites, potholes, detours, flooding, and/or other obstructions. In some examples, the neural networks 992, the updated neural networks 992, and/or the map information 994 may have resulted from new training and/or experiences represented in data received from any number of vehicles in the environment, and/or based on training performed at a datacenter (e.g., using the server(s) 978 and/or other servers).

The server(s) 978 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 990, and/or the machine learning models may be used by the server(s) 978 to remotely monitor the vehicles.

In some examples, the server(s) 978 may receive data from the vehicles and apply the data to up-to-date real-time neural networks for real-time intelligent inferencing. The server(s) 978 may include deep-learning supercomputers and/or dedicated AI computers powered by GPU(s) 984, such as a DGX and DGX Station machines developed by NVIDIA. However, in some examples, the server(s) 978 may include deep learning infrastructure that use only CPU-powered datacenters.

The deep-learning infrastructure of the server(s) 978 may be capable of fast, real-time inferencing, and may use that capability to evaluate and verify the health of the processors, software, and/or associated hardware in the vehicle 900. For example, the deep-learning infrastructure may receive periodic updates from the vehicle 900, such as a sequence of images and/or objects that the vehicle 900 has located in that sequence of images (e.g., via computer vision and/or other machine learning object classification techniques). The deep-learning infrastructure may run its own neural network to identify the objects and compare them with the objects identified by the vehicle 900 and, if the results do not match and the infrastructure concludes that the AI in the vehicle 900 is malfunctioning, the server(s) 978 may transmit a signal to the vehicle 900 instructing a fail-safe computer of the vehicle 900 to assume control, notify the passengers, and complete a safe parking maneuver.

For inferencing, the server(s) 978 may include the GPU(s) 984 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 10:
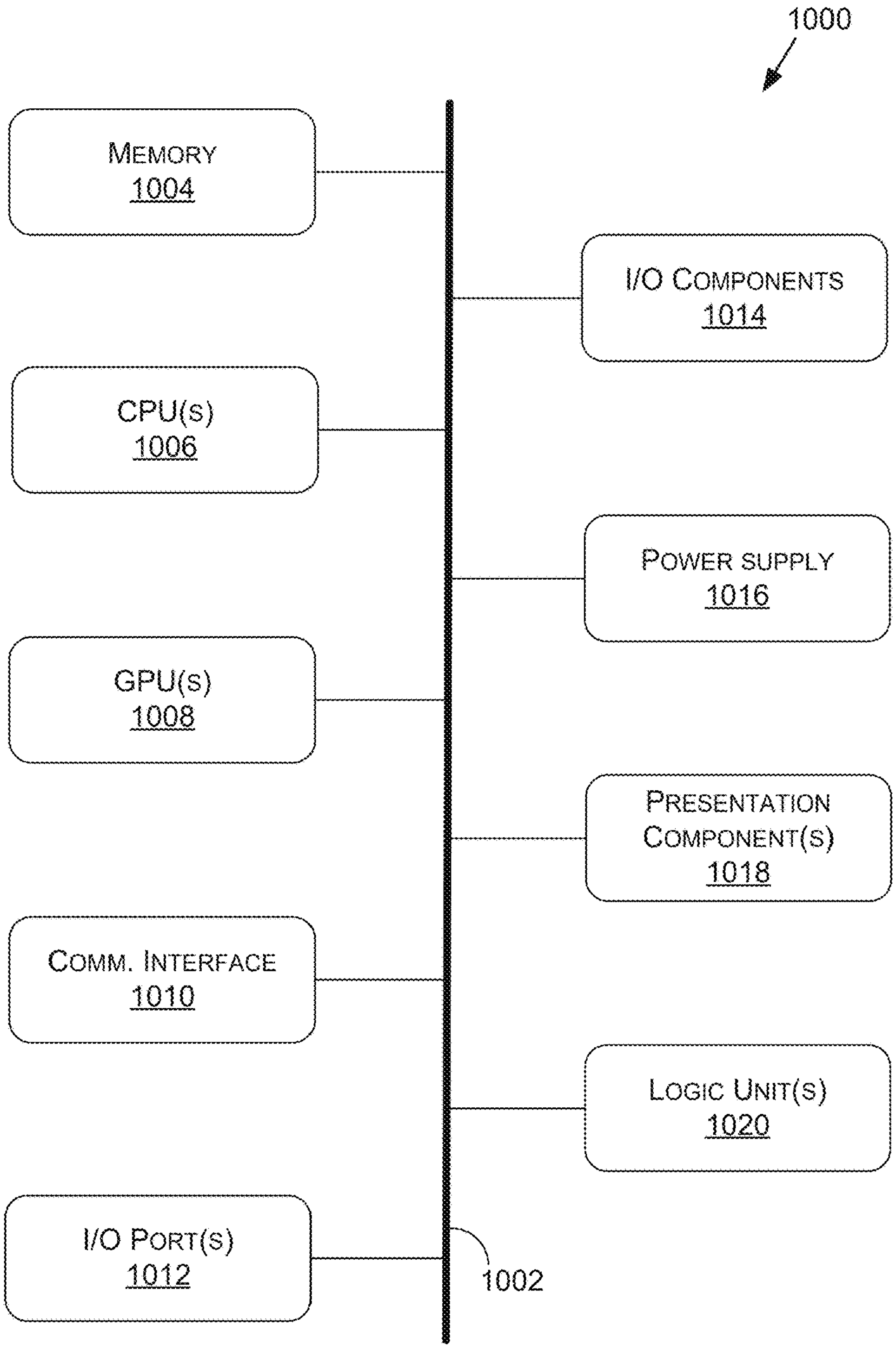
FIG. 10 is a block diagram of an example computing device suitable for use in implementing some embodiments of the present disclosure.

FIG. 10 is a block diagram of an example computing device(s) 1000 suitable for use in implementing some embodiments of the present disclosure. Computing device 1000 may include an interconnect system 1002 that directly or indirectly couples the following devices: memory 1004, one or more central processing units (CPUs) 1006, one or more graphics processing units (GPUs) 1008, a communication interface 1010, input/output (I/O) ports 1012, input/output components 1014, a power supply 1016, one or more presentation components 1018 (e.g., display(s)), and one or more logic units 1020. In at least one embodiment, the computing device(s) 1000 may comprise one or more virtual machines (VMs), and/or any of the components thereof may comprise virtual components (e.g., virtual hardware components). For non-limiting examples, one or more of the GPUs 1008 may comprise one or more vGPUs, one or more of the CPUs 1006 may comprise one or more vCPUs, and/or one or more of the logic units 1020 may comprise one or more virtual logic units. As such, a computing device(s) 1000 may include discrete components (e.g., a full GPU dedicated to the computing device 1000), virtual components (e.g., a portion of a GPU dedicated to the computing device 1000), or a combination thereof.

Although the various blocks of FIG. 10 are shown as connected via the interconnect system 1002 with lines, this is not intended to be limiting and is for clarity only. For example, in some embodiments, a presentation component 1018, such as a display device, may be considered an I/O component 1014 (e.g., if the display is a touch screen). As another example, the CPUs 1006 and/or GPUs 1008 may include memory (e.g., the memory 1004 may be representative of a storage device in addition to the memory of the GPUs 1008, the CPUs 1006, and/or other components). In other words, the computing device of FIG. 10 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 10.

The interconnect system 1002 may represent one or more links or busses, such as an address bus, a data bus, a control bus, or a combination thereof. The interconnect system 1002 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1006 may be directly connected to the memory 1004. Further, the CPU 1006 may be directly connected to the GPU 1008. Where there is direct, or point-to-point connection between components, the interconnect system 1002 may include a PCIe link to carry out the connection. In these examples, a PCI bus need not be included in the computing device 1000.

The memory 1004 may include any of a variety of computer-readable media. The computer-readable media may be any available media that may be accessed by the computing device 1000. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1004 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1000. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1006 may be configured to execute at least some of the computer-readable instructions to control one or more components of the computing device 1000 to perform one or more of the methods and/or processes described herein. The CPU(s) 1006 may each include one or more cores (e.g., one, two, four, eight, twenty-eight, seventy-two, etc.) that are capable of handling a multitude of software threads simultaneously. The CPU(s) 1006 may include any type of processor, and may include different types of processors depending on the type of computing device 1000 implemented (e.g., processors with fewer cores for mobile devices and processors with more cores for servers). For example, depending on the type of computing device 1000, the processor may be an Advanced RISC Machines (ARM) processor implemented using Reduced Instruction Set Computing (RISC) or an x86 processor implemented using Complex Instruction Set Computing (CISC). The computing device 1000 may include one or more CPUs 1006 in addition to one or more microprocessors or supplementary co-processors, such as math co-processors.

In addition to or alternatively from the CPU(s) 1006, the GPU(s) 1008 may be configured to execute at least some of the computer-readable instructions to control one or more components of the computing device 1000 to perform one or more of the methods and/or processes described herein. One or more of the GPU(s) 1008 may be an integrated GPU (e.g., with one or more of the CPU(s) 1006 and/or one or more of the GPU(s) 1008 may be a discrete GPU. In embodiments, one or more of the GPU(s) 1008 may be a coprocessor of one or more of the CPU(s) 1006. The GPU(s) 1008 may be used by the computing device 1000 to render graphics (e.g., 3D graphics) or perform general purpose computations. For example, the GPU(s) 1008 may be used for General-Purpose computing on GPUs (GPGPU). The GPU(s) 1008 may include hundreds or thousands of cores that are capable of handling hundreds or thousands of software threads simultaneously. The GPU(s) 1008 may generate pixel data for output images in response to rendering commands (e.g., rendering commands from the CPU(s) 1006 received via a host interface). The GPU(s) 1008 may include graphics memory, such as display memory, for storing pixel data or any other suitable data, such as GPGPU data. The display memory may be included as part of the memory 1004. The GPU(s) 1008 may include two or more GPUs operating in parallel (e.g., via a link). The link may directly connect the GPUs (e.g., using NVLINK) or may connect the GPUs through a switch (e.g., using NVSwitch). When combined together, each GPU 1008 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1006 and/or the GPU(s) 1008, the logic unit(s) 1020 may be configured to execute at least some of the computer-readable instructions to control one or more components of the computing device 1000 to perform one or more of the methods and/or processes described herein. In embodiments, the CPU(s) 1006, the GPU(s) 1008, and/or the logic unit(s) 1020 may discretely or jointly perform any combination of the methods, processes and/or portions thereof. One or more of the logic units 1020 may be part of and/or integrated in one or more of the CPU(s) 1006 and/or the GPU(s) 1008 and/or one or more of the logic units 1020 may be discrete components or otherwise external to the CPU(s) 1006 and/or the GPU(s) 1008. In embodiments, one or more of the logic units 1020 may be a coprocessor of one or more of the CPU(s) 1006 and/or one or more of the GPU(s) 1008.

Examples of the logic unit(s) 1020 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1010 may include one or more receivers, transmitters, and/or transceivers that enable the computing device 1000 to communicate with other computing devices via an electronic communication network, included wired and/or wireless communications. The communication interface 1010 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1020 and/or communication interface 1010 may include one or more data processing units (DPUs) to transmit data received over a network and/or through interconnect system 1002 directly to (e.g., a memory of) one or more GPU(s) 1008.

The I/O ports 1012 may enable the computing device 1000 to be logically coupled to other devices including the I/O components 1014, the presentation component(s) 1018, and/or other components, some of which may be built in to (e.g., integrated in) the computing device 1000. Illustrative I/O components 1014 include a microphone, mouse, keyboard, joystick, game pad, game controller, satellite dish, scanner, printer, wireless device, etc. The I/O components 1014 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 may be include depth cameras, such as stereoscopic camera systems, infrared camera systems, RGB camera systems, touchscreen technology, and combinations of these, for gesture detection and recognition. Additionally, the computing device 1000 may include accelerometers or gyroscopes (e.g., as part of an inertia measurement unit (IMU)) that enable detection of motion. In some examples, the output of the accelerometers or gyroscopes may be used by the computing device 1000 to render immersive augmented reality or virtual reality.

The power supply 1016 may include a hard-wired power supply, a battery power supply, or a combination thereof. The power supply 1016 may provide power to the computing device 1000 to enable the components of the computing device 1000 to operate.

The presentation component(s) 1018 may include a display (e.g., a monitor, a touch screen, a television screen, a heads-up-display (HUD), other display types, or a combination thereof), speakers, and/or other presentation components. The presentation component(s) 1018 may receive data from other components (e.g., the GPU(s) 1008, the CPU(s) 1006, DPUs, etc.), and output the data (e.g., as an image, video, sound, etc.).

Example Data Center

Figure 11:
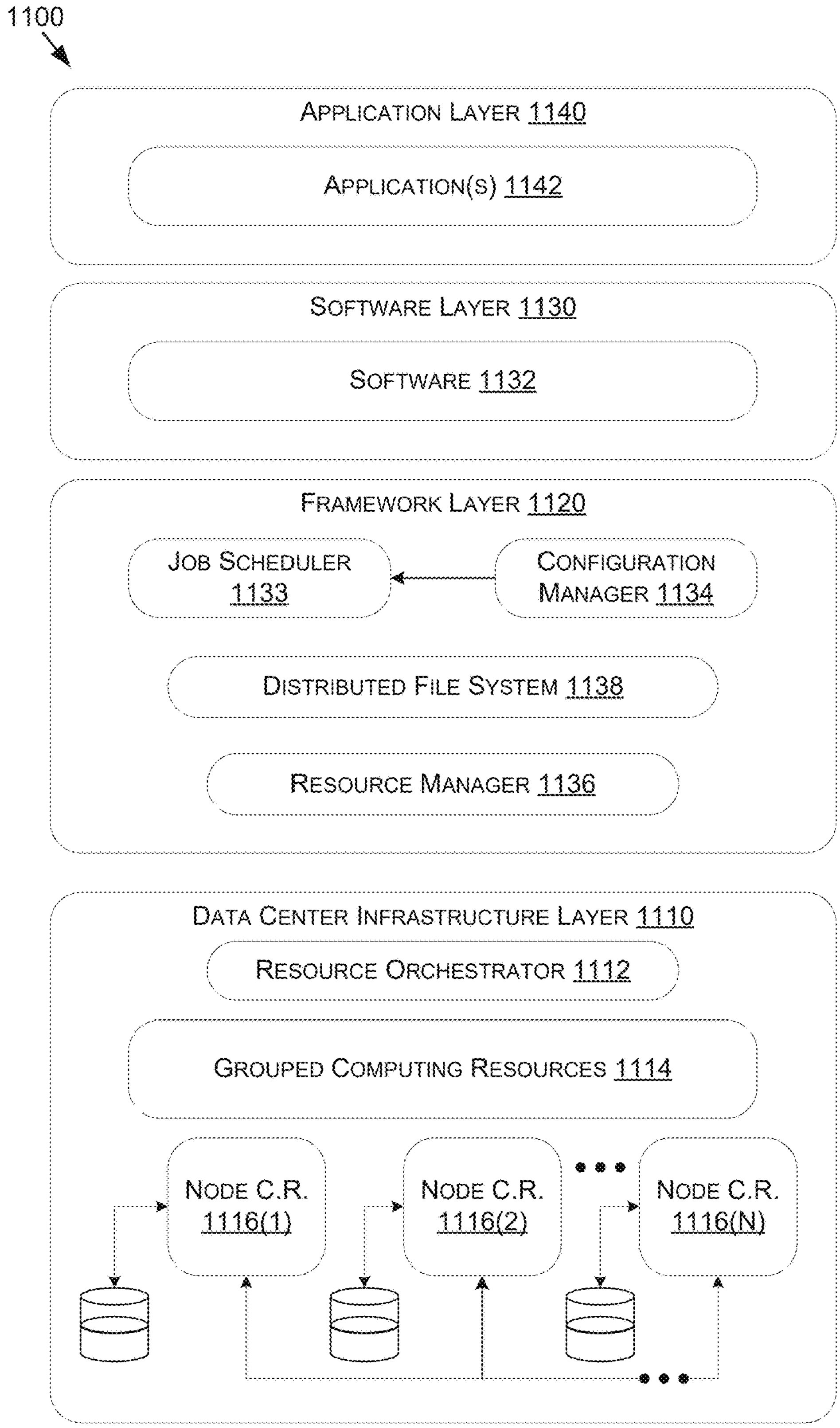
FIG. 11 is a block diagram of an example data center suitable for use in implementing some embodiments of the present disclosure.

FIG. 11 illustrates an example data center 1100 that may be used in at least one embodiments of the present disclosure. The data center 1100 may include a data center infrastructure layer 1110, a framework layer 1120, a software layer 1130, and/or an application layer 1140.

As shown in FIG. 11, the data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1116(1)-1116(N) may correspond to a server having one or more of the above-mentioned computing resources. In addition, in some embodiments, the node C.R.s 1116(1)-11161 (N) may include one or more virtual components, such as vGPUs, vCPUs, and/or the like, and/or one or more of the node C.R.s 1116(1)-1116(N) may correspond to a virtual machine (VM).

In at least one embodiment, grouped computing resources 1114 may include separate groupings of node C.R.s 1116 housed within one or more racks (not shown), or many racks housed in data centers at various geographical locations (also not shown). Separate groupings of node C.R.s 1116 within grouped computing resources 1114 may include grouped compute, network, memory or storage resources that may be configured or allocated to support one or more workloads. In at least one embodiment, several node C.R.s 1116 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1112 may configure or otherwise control one or more node C.R.s 1116(1)-1116(N) and/or grouped computing resources 1114. In at least one embodiment, resource orchestrator 1112 may include a software design infrastructure (SDI) management entity for the data center 1100. The resource orchestrator 1112 may include hardware, software, or some combination thereof.

In at least one embodiment, as shown in FIG. 11, framework layer 1120 may include a job scheduler 1133, a configuration manager 1134, a resource manager 1136, and/or a distributed file system 1138. The framework layer 1120 may include a framework to support software 1132 of software layer 1130 and/or one or more application(s) 1142 of application layer 1140. The software 1132 or application(s) 1142 may respectively include web-based service software or applications, such as those provided by Amazon Web Services, Google Cloud and Microsoft Azure. The framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1133 may include a Spark driver to facilitate scheduling of workloads supported by various layers of data center 1100. The configuration manager 1134 may be capable of configuring different layers such as software layer 1130 and framework layer 1120 including Spark and distributed file system 1138 for supporting large-scale data processing. The resource manager 1136 may be capable of managing clustered or grouped computing resources mapped to or allocated for support of distributed file system 1138 and job scheduler 1133. In at least one embodiment, clustered or grouped computing resources may include grouped computing resource 1114 at data center infrastructure layer 1110. The resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. One or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116(1)-1116(N), grouped computing resources 1114, and/or distributed file system 1138 of framework layer 1120. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. Self-modifying actions may relieve a data center operator of data center 1100 from making possibly bad configuration decisions and possibly avoiding underutilized and/or poor performing portions of a data center.

The data center 1100 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1100. In at least one embodiment, trained or deployed machine learning models corresponding to one or more neural networks may be used to infer or predict information using resources described above with respect to the data center 1100 by using weight parameters calculated through one or more training techniques, such as but not limited to those described herein.

In at least one embodiment, the data center 1100 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1000 of FIG. 10—e.g., each device may include similar components, features, and/or functionality of the computing device(s) 1000. In addition, where backend devices (e.g., servers, NAS, etc.) are implemented, the backend devices may be included as part of a data center 1100, an example of which is described in more detail herein with respect to FIG. 11.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1000 described herein with respect to FIG. 10. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

EXAMPLE PARAGRAPHS

A. A method comprising: obtaining state data indicative of one or more first measured states of a machine; determining, using one or more Kolmogorov-Arnold Networks (KANs) to process the state data, one or more predicted differences between the one or more first measured states and one or more first predicted states of the machine, the one or more first predicted states determined using one or more models of a model predictive control (MPC) system of the machine; updating, based at least on the one or more predicted differences, one or more parameters associated with the one or more models of the MPC system, wherein the updating of the one or more parameters reduces one or more differences between one or more second measured states of the machine and one or more second predicted states of the machine; and sending, to one or more components or systems of the machine, one or more control inputs to cause the machine to perform one or more operations, the one or more control inputs determined using the MPC system subsequent to the updating of the one or more parameters associated with the one or more models.

B. The method of paragraph A, further comprising: computing one or more disturbance values corresponding to the one or more predicted differences; and updating one or more disturbance vectors of the one or more models to include the one or more disturbance values, wherein the updating of the one or more parameters associated with the one or more models of the MPC system comprises the updating of the one or more disturbance vectors.

C. The method of any one of paragraphs A-B, further comprising: determining that one or more magnitudes of the one or more predicted differences meet or exceed one or more thresholds; and based at least on the one or more magnitudes meeting or exceeding the one or more thresholds, updating one or more parameters of the one or more KANs using, at least: training input data including one or more third measured states of the machine; and ground truth data including one or more calculated differences between the one or more third measured states and one or more third predicted states of the machine.

D. The method of any one of paragraphs A-C, wherein the one or more KANs process the state data for a current iteration prior to the one or more models of the MPC system.

E. The method of any one of paragraphs A-D, wherein, based at least on the use of the one or more KANs, a safety level associated with the MPC system meets or exceeds an Automotive Safety Integrity Level (ASIL) D classification.

F. The method of any one of paragraphs A-E, wherein: the one or more first measured states of the machine include one or more of: a lateral position associated with the machine; a lateral acceleration or velocity associated with the machine; a heading associated with the machine; a yaw rate associated with the machine; a longitudinal acceleration or speed associated with the machine; a steering angle associated with the machine; or a curvature associated with the machine; and the one or more predicted differences include one or more of: a predicted lateral position error associated with the machine; a predicted lateral acceleration or velocity error associated with the machine; a predicted heading error associated with the machine; a predicted yaw rate error associated with the machine; a predicted longitudinal acceleration or speed error associated with the machine; a predicted steering angle error associated with the machine; or a predicted curvature error associated with the machine.

G. A system comprising: one or more processors to: obtain state data indicative of one or more first measured states of a machine; determine, using one or more machine learning models and based at least on the state data, one or more first predicted errors associated with the one or more first measured states; and update, based at least on the one or more first predicted errors, one or more parameters associated with one or more models of a model predictive control (MPC) system of the machine, wherein the update of the one or more parameters reduces one or more second predicted errors associated with one or more second measured states of the machine.

H. The system of paragraph G, the one or more processors further to: obtain control data indicative of one or more control inputs applied to one or more components of the machine, wherein the determination of the one or more first predicted errors using the one or more machine learning models is further based at least on the control data.

I. The system of any one of paragraphs G-H, the one or more processors further to: send, to one or more components or systems of the machine, one or more control inputs to cause the machine to perform one or more operations, the one or more control inputs determined using the MPC system subsequent to the update of the one or more parameters associated with the one or more models.

J. The system of any one of paragraphs G-I, the one or more processors further to: determine, using the one or more machine learning models and based at least on the state data, one or more predicted differences between the one or more first measured states and one or more predicted states of the machine, the one or more predicted states determined using the one or more models of the MPC system, wherein the one or more first predicted errors correspond to the one or more predicted differences.

K. The system of any one of paragraphs G-J, the one or more processors further to: determine that one or more first values associated with the one or more first predicted errors meet or exceed one or more thresholds; and update, based at least on the one or more first values meeting or exceeding the one or more thresholds, one or more parameters of the one or more machine learning models to reduce one or more second values associated with the one or more second predicted errors.

L. The system of any one of paragraphs G-K, the one or more processors further to: compute, as ground truth data for training the one or more machine learning models, one or more differences between the one or more first measured states and one or more first predicted states corresponding to the one or more first measured states; apply, as training input data to the one or more machine learning models, the one or more first measured states; obtain, based at least on using the one or more machine learning models to process the training input data, one or more predicted differences between the one or more first measured states and the one or more first predicted states; and update the one or more parameters of the one or more machine learning models based at least on comparing the one or more predicted differences with the ground truth data.

M. The system of any one of paragraphs G-L, the one or more processors further to: update one or more disturbance vectors of the one or more models of the MPC system to include one or more values corresponding to the one or more first predicted errors, wherein the update of the one or more parameters associated with the one or more models of the MPC system comprises the update of the one or more disturbance vectors.

N. The system of any one of paragraphs G-M, wherein the one or more first measured states of the machine include at least one of: a lateral position associated with the machine; a lateral velocity associated with the machine; a heading associated with the machine; or a curvature associated with the machine.

O. The system of any one of paragraphs G-N, wherein the one or more first predicted errors include at least one of: a predicted lateral position error associated with the machine; a predicted lateral velocity error associated with the machine; a predicted heading error associated with the machine; or a predicted curvature error associated with the machine.

P. The system of any one of paragraphs G-O, wherein the one or more machine learning models include one or more Kolmogorov-Arnold Networks (KANs).

Q. The system of any one of paragraphs G-P, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models; a system for performing operations using one or more vision language models; a system for performing operations using one or more multi-modal language models; a system for using or deploying one or more inference microservices; a system for performing one or more conversational AI operations; a system for generating synthetic data; a system for presenting at least one of virtual reality content, augmented reality content, or mixed reality content; a system incorporating one or more virtual machines; a system implemented at least partially in a data center; or a system implemented at least partially using cloud computing resources.

R. One or more processors comprising: processing circuitry to cause performance of one or more control operations of a machine based at least on one or more outputs of a model predictive control (MPC) system, the one or more outputs of the MPC system being generated based at least on one or more updated parameters associated with one or more models of the MPC system determined using one or more Kolmogorov-Arnold Networks (KANs).

S. The one or more processors of paragraph R, wherein the one or more KANs process the state data prior to the one or more models of the MPC system.

T. The one or more processors of any one of paragraphs R-S, wherein the one or more processors are comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models; a system for performing operations using one or more vision language models; a system for performing operations using one or more multi-modal language models; a system for using or deploying one or more inference microservices; a system for performing one or more conversational AI operations; a system for generating synthetic data; a system for presenting at least one of virtual reality content, augmented reality content, or mixed reality content; a system incorporating one or more virtual machines; a system implemented at least partially in a data center; or a system implemented at least partially using cloud computing resources.

What is claimed is:

1. A method comprising:

obtaining state data indicative of one or more first measured states of a machine;

determining, using one or more Kolmogorov-Arnold Networks (KANs) to process the state data, one or more predicted differences between the one or more first measured states and one or more first predicted states of the machine, the one or more first predicted states determined using one or more models of a model predictive control (MPC) system of the machine;

updating, based at least on the one or more predicted differences, one or more parameters associated with the one or more models of the MPC system, wherein the updating of the one or more parameters reduces one or more differences between one or more second measured states of the machine and one or more second predicted states of the machine; and sending, to one or more components or systems of the machine, one or more control inputs to cause the machine to perform one or more operations, the one or more control inputs determined using the MPC system subsequent to the updating of the one or more parameters associated with the one or more models.

2. The method of claim 1, further comprising:

computing one or more disturbance values corresponding to the one or more predicted differences; and updating one or more disturbance vectors of the one or more models to include the one or more disturbance values, wherein the updating of the one or more parameters associated with the one or more models of the MPC system comprises the updating of the one or more disturbance vectors.

3. The method of claim 1, further comprising:

determining that one or more magnitudes of the one or more predicted differences meet or exceed one or more thresholds; and based at least on the one or more magnitudes meeting or exceeding the one or more thresholds, updating one or more parameters of the one or more KANs using, at least:

training input data including one or more third measured states of the machine; and ground truth data including one or more calculated differences between the one or more third measured states and one or more third predicted states of the machine.

4. The method of claim 1, wherein the one or more KANs process the state data for a current iteration prior the one or more models of the MPC system.

5. The method of claim 1, wherein, based at least on the use of the one or more KANs, a safety level associated with the MPC system meets or exceeds an Automotive Safety Integrity Level (ASIL) D classification.

6. The method of claim 1, wherein:

the one or more first measured states of the machine include one or more of:

a lateral position associated with the machine;

a lateral acceleration or velocity associated with the machine;

a heading associated with the machine;

a yaw rate associated with the machine;

a longitudinal acceleration or speed associated with the machine;

a steering angle associated with the machine; or a curvature associated with the machine; and the one or more predicted differences include one or more of:

a predicted lateral position error associated with the machine;

a predicted lateral acceleration or velocity error associated with the machine;
a predicted heading error associated with the machine;
a predicted yaw rate error associated with the machine;
a predicted longitudinal acceleration or speed error associated with the machine;
a predicted steering angle error associated with the machine; or
a predicted curvature error associated with the machine.

7. A system comprising:
one or more processors to:
obtain state data indicative of one or more first measured states of a machine;
determine, using one or more machine learning models and based at least on the state data, one or more first predicted errors associated with the one or more first measured states; and
update, based at least on the one or more first predicted errors, one or more parameters associated with one or more models of a model predictive control (MPC) system of the machine, wherein the update of the one or more parameters reduces one or more second predicted errors associated with one or more second measured states of the machine.

8. The system of claim 7, the one or more processors further to:
obtain control data indicative of one or more control inputs applied to one or more components of the machine,
wherein the determination of the one or more first predicted errors using the one or more machine learning models is further based at least on the control data.

9. The system of claim 7, the one or more processors further to:
send, to one or more components or systems of the machine, one or more control inputs to cause the machine to perform one or more operations, the one or more control inputs determined using the MPC system subsequent to the update of the one or more parameters associated with the one or more models.

10. The system of claim 7, the one or more processors further to:
determine, using the one or more machine learning models and based at least on the state data, one or more predicted differences between the one or more first measured states and one or more predicted states of the machine, the one or more predicted states determined using the one or more models of the MPC system,
wherein the one or more first predicted errors correspond to the one or more predicted differences.

11. The system of claim 7, the one or more processors further to:
determine that one or more first values associated with the one or more first predicted errors meet or exceed one or more thresholds; and
update, based at least on the one or more first values meeting or exceeding the one or more thresholds, one or more parameters of the one or more machine learning models to reduce one or more second values associated with the one or more second predicted errors.

12. The system of claim 11, the one or more processors further to:
compute, as ground truth data for training the one or more machine learning models, one or more differences between the one or more first measured states and one or more first predicted states corresponding to the one or more first measured states;
apply, as training input data to the one or more machine learning models, the one or more first measured states;
obtain, based at least on using the one or more machine learning models to process the training input data, one or more predicted differences between the one or more first measured states and the one or more first predicted states; and
update the one or more parameters of the one or more machine learning models based at least on comparing the one or more predicted differences with the ground truth data.

13. The system of claim 7, the one or more processors further to:
update one or more disturbance vectors of the one or more models of the MPC system to include one or more values corresponding to the one or more first predicted errors,
wherein the update of the one or more parameters associated with the one or more models of the MPC system comprises the update of the one or more disturbance vectors.

14. The system of claim 7, wherein the one or more first measured states of the machine include at least one of:
a lateral position associated with the machine;
a lateral velocity associated with the machine;
a heading associated with the machine; or
a curvature associated with the machine.

15. The system of claim 7, wherein the one or more first predicted errors include at least one of:
a predicted lateral position error associated with the machine;
a predicted lateral velocity error associated with the machine;
a predicted heading error associated with the machine; or
a predicted curvature error associated with the machine.

16. The system of claim 7, wherein the one or more machine learning models include one or more Kolmogorov-Arnold Networks (KANs).

17. The system of claim 7, wherein the system is comprised in at least one of:
a control system for an autonomous or semi-autonomous machine;
a perception system for an autonomous or semi-autonomous machine;
a system for performing one or more simulation operations;
a system for performing one or more digital twin operations;
a system for performing light transport simulation;
a system for performing collaborative content creation for 3D assets;
a system for performing one or more deep learning operations;
a system implemented using an edge device;
a system implemented using a robot;
a system for performing one or more generative AI operations;
a system for performing operations using a large language model;
a system for performing operations using one or more vision language models (VLMs);
a system for performing operations using one or more multi-modal language models;
a system for using or deploying one or more inference microservices;

- a system for performing one or more conversational AI operations;
- a system for generating synthetic data;
- a system for presenting at least one of virtual reality content, augmented reality content, or mixed reality content;
- a system incorporating one or more virtual machines (VMs);
- a system implemented at least partially in a data center; or
- a system implemented at least partially using cloud computing resources.

18. One or more processors comprising:

processing circuitry to cause performance of one or more control operations of a machine based at least on one or more outputs of a model predictive control (MPC) system, the one or more outputs of the MPC system being generated based at least on one or more updated parameters associated with one or more models of the MPC system determined using one or more Kolmogorov-Arnold Networks (KANs).

19. The one or more processors of claim 18, wherein the one or more KANs process state data prior to determining the one or more updated parameters associated with the one or more models of the MPC system.

20. The one or more processors of claim 18, wherein the one or more processors are comprised in at least one of:

- a control system for an autonomous or semi-autonomous machine;
- a perception system for an autonomous or semi-autonomous machine;
- a system for performing one or more simulation operations;
- a system for performing one or more digital twin operations;
- a system for performing light transport simulation;
- a system for performing collaborative content creation for 3D assets;
- a system for performing one or more deep learning operations;
- a system implemented using an edge device;
- a system implemented using a robot;
- a system for performing one or more generative AI operations;
- a system for performing operations using a large language model;
- a system for performing operations using one or more vision language models (VLMs);
- a system for performing operations using one or more multi-modal language models;
- a system for using or deploying one or more inference microservices;
- a system for performing one or more conversational AI operations;
- a system for generating synthetic data;
- a system for presenting at least one of virtual reality content, augmented reality content, or mixed reality content;
- a system incorporating one or more virtual machines (VMs);
- a system implemented at least partially in a data center; or
- a system implemented at least partially using cloud computing resources.

* * * * *